US011526955B2

(12) United States Patent
Bester

(10) Patent No.: US 11,526,955 B2
(45) Date of Patent: Dec. 13, 2022

(54) PROTOCOL-BASED SYSTEM AND METHOD FOR ESTABLISHING A MULTI-PARTY CONTRACT

(71) Applicant: ENTERSEKT INTERNATIONAL LIMITED, Ebene (MU)

(72) Inventor: Daniël Deetlefs Bester, Stellenbosch (ZA)

(73) Assignee: Entersekt International Limited, Ebene (MU)

( * ) Notice: Subject to any disclaimer, the term of this patent is extended or adjusted under 35 U.S.C. 154(b) by 291 days.

(21) Appl. No.: 16/618,079

(22) PCT Filed: May 30, 2018

(86) PCT No.: PCT/IB2018/053833
§ 371 (c)(1),
(2) Date: Nov. 27, 2019

(87) PCT Pub. No.: WO2018/220541
PCT Pub. Date: Dec. 6, 2018

(65) Prior Publication Data
US 2020/0202468 A1 Jun. 25, 2020

(30) Foreign Application Priority Data
May 30, 2017 (ZA) .................................. 2017/03688

(51) Int. Cl.
*G06Q 30/00* (2012.01)
*G06Q 50/18* (2012.01)
(Continued)

(52) U.S. Cl.
CPC .......... *G06Q 50/188* (2013.01); *G06F 21/64* (2013.01); *G06Q 10/10* (2013.01); *G06Q 20/02* (2013.01); *G06Q 2220/10* (2013.01)

(58) Field of Classification Search
CPC ...... G06Q 50/188; G06Q 10/10; G06Q 20/02; G06Q 2220/10; G06F 21/64
See application file for complete search history.

(56) References Cited

U.S. PATENT DOCUMENTS 6,067,531 A * 5/2000 Hoyt ...................... G06Q 40/00
705/35
7,085,926 B1 * 8/2006 Peach ..................... G06Q 20/00
705/64

(Continued)

OTHER PUBLICATIONS

Lai, G., & Sycara, K., A Generic Framework for Automated Multi-Attribute Negotiation, Mar. 2009, Springer Nature B.V. (Year: 2009).*

(Continued)

*Primary Examiner* — Matthew L Hamilton
(74) *Attorney, Agent, or Firm* — Knobbe, Martens, Olson & Bear, LLP

(57) ABSTRACT

A protocol-based system and method for establishing a multi-party contract are disclosed. In a method conducted at a computing device associated with an entity, a set of contract data elements relating to a contract to be established is received from either one of another entity or a deal negotiation component associated with the entity. The contract data elements are validated using an associated contract schema and a schema-based validation algorithm. If the contract data elements are valid, the contract data elements are transmitted to the other of the deal negotiation component or another entity. Transmitting the contract data elements to another entity includes generating a digital signature associated with the contract data elements by digitally signing the contract data elements or a representation thereof and transmitting the digital signature and either of the contract data elements or the representation thereof to the other entity.

20 Claims, 7 Drawing Sheets

(51) Int. Cl.
*G06F 21/64* (2013.01)
*G06Q 10/10* (2012.01)
*G06Q 20/02* (2012.01)

(56) References Cited

U.S. PATENT DOCUMENTS

| | | | | |
|---|---|---|---|---|
| 7,149,724 | B1* | 12/2006 | Flanagan | G06Q 30/00 |
| | | | | 705/80 |
| 7,373,325 | B1* | 5/2008 | Hadingham | G06Q 50/188 |
| | | | | 705/37 |
| 7,568,106 | B2 | 7/2009 | Goodman et al. | |
| 11,042,916 | B1* | 6/2021 | Raynor | A61B 5/076 |
| 2002/0091651 | A1* | 7/2002 | Petrogiannis | G06F 21/64 |
| | | | | 705/76 |
| 2002/0178103 | A1* | 11/2002 | Dan | G06Q 50/188 |
| | | | | 705/37 |
| 2003/0177361 | A1* | 9/2003 | Wheeler | H04L 63/0428 |
| | | | | 713/176 |
| 2003/0187648 | A1* | 10/2003 | Dharanipragada | G10L 15/197 |
| | | | | 704/E15.044 |
| 2003/0204466 | A1* | 10/2003 | Guo | G06Q 50/188 |
| | | | | 705/37 |
| 2004/0172371 | A1* | 9/2004 | Mitsuoka | G06Q 10/06 |
| | | | | 705/80 |
| 2004/0243495 | A1* | 12/2004 | Karp | G06Q 40/00 |
| | | | | 705/35 |
| 2005/0108105 | A1* | 5/2005 | Hagebarth | G06Q 30/0601 |
| | | | | 705/26.1 |
| 2005/0138382 | A1 | 6/2005 | Hougaard et al. | |
| 2005/0289349 | A1* | 12/2005 | Franke | H04L 9/3247 |
| | | | | 713/176 |
| 2006/0160593 | A1* | 7/2006 | Karp | G06Q 30/06 |
| | | | | 463/9 |
| 2007/0005962 | A1* | 1/2007 | Baker | G06Q 40/00 |
| | | | | 713/168 |
| 2008/0046265 | A1* | 2/2008 | Lee | G06Q 10/06 |
| | | | | 705/7.36 |
| 2008/0243662 | A1 | 10/2008 | Subramaniam | |
| 2011/0289318 | A1* | 11/2011 | Zhang | H04L 9/3226 |
| | | | | 713/176 |
| 2013/0191238 | A1* | 7/2013 | Ozonat | G06Q 30/02 |
| | | | | 705/26.4 |
| 2014/0214690 | A1* | 7/2014 | Ozonat | G06Q 30/00 |
| | | | | 705/80 |
| 2014/0222698 | A1* | 8/2014 | Potdar | G06Q 30/018 |
| | | | | 705/317 |
| 2017/0287038 | A1* | 10/2017 | Krasadakis | G06Q 30/0201 |
| 2020/0020061 | A1* | 1/2020 | Sunder | G06N 5/043 |
| 2021/0012289 | A1* | 1/2021 | Hsieh | H04L 65/403 |
| 2021/0133903 | A1* | 5/2021 | Poole, III | G06F 21/6209 |
| 2022/0108412 | A1* | 4/2022 | Sengupta | G06N 20/00 |

OTHER PUBLICATIONS

Christoph Meinel et al, "Chapter 5: Digital Security" In: "Digitale Kommunikation: Vernetze, multimedia, Sicherheit", May 14, 2014, Springer, XP055493611, pp. 291-336.

Elgamal T: "A Public Key Cryptosystem and a signature Scheme Based on Discrete Logarithms", IEEE Transactions on Information Theory, IEEE Press, USA, vol. 31, No. 4, Jul. 1, 1985, XP000565224, pp. 469-472.

International Search Report of corresponding PCT Application No. PCT/IB2018/053833 filed May 30, 2018—4 pages (dated Jul. 30, 2018).

* cited by examiner

PROTOCOL-BASED SYSTEM AND METHOD FOR ESTABLISHING A MULTI-PARTY CONTRACT

CROSS-REFERENCE TO RELATED APPLICATIONS

This application claims priority from South African provisional patent application number 2017/03688 filed on 30 May 2017, which is incorporated by reference herein.

FIELD OF THE INVENTION

This invention relates to protocol-based system and method for establishing a multi-party contract.

BACKGROUND TO THE INVENTION

Entities such as companies or corporations enter into transaction agreements on a daily basis. In some cases, a single framework agreement may be established to govern high-level details regarding the relationship while individual 'transaction agreements' may be entered into to govern the specifics of individual transactions.

As one example, a retail bank may enter into an agreement with an insurance provider to sell life insurance to the client base of the retail bank. A framework agreement may govern the general conduct between the two entities while individual transaction agreements may be concluded for each life that is insured by the insurance provider. A basic transaction agreement, for the purpose of illustration, may include the full name of the insured life, the birthdate of the insured life, the monthly premium and the value at which the life is insured.

It may be advantageous for such transaction agreements (or contracts) to be negotiated and processed by computing devices maintained by the respective entities, with minimal to no human intervention. A difficulty that may arise however is that of repudiation, where respective entities who are party to the contract can deny having agreed to enter into the contract on the stipulated terms. For example, one entity may nefariously alter log files maintained by that entity's computing device responsible for establishment of the contract in an effort to show that the contract was agreed on different terms.

There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a computing device associated with an entity comprising: receiving a set of contract data elements relating to a contract to be established, the set of contract data elements being received from either one of: another entity; or, a deal negotiation component associated with the entity; validating the contract data elements using an associated contract schema and a schema-based validation algorithm; and, if the contract data elements are valid, transmitting the contract data elements to the other of: the deal negotiation component; or, another entity, wherein transmitting the contract data elements to another entity includes: generating a digital signature associated with the contract data elements by digitally signing the contract data elements or a representation thereof using an encryption key associated with the entity; and, transmitting the digital signature and either of the contract data elements or the representation thereof to the other entity.

A further feature provides for receiving the contract data elements from the deal negotiation component associated with the entity to include querying a contract identifier field associated with the contract data elements, the contract identifier field being configured for storing a globally unique contract identifier.

A yet further feature provides for the method to include, if the contract identifier field contains a null value: obtaining a contract identifier; associating the contract data elements with the contract identifier including updating the contract identifier field to include the obtained contract identifier; and, storing the contract data elements.

A still further feature provides for the method to include, if the contract identifier field contains a contract identifier: accessing a set of contract data elements associated with the contract identifier and having been stored previously, the previously stored set of contract data elements having been stored in association with an originating entity digital signature, the originating entity digital signature having been generated by an originating entity digitally signing the previously stored set of contract data elements or a representation thereof using an encryption key associated with the originating entity; and, comparing the received contract data elements with the accessed contract data elements.

A further feature provides, if the received contract data elements are not the same as the accessed contract data elements, for transmitting the digital signature and either of the contract data elements or the representation thereof to the other entity to include: generating a digital signature associated with the received contract data elements by digitally signing the received contract data elements or a representation thereof using the encryption key associated with the entity; and, transmitting the digital signature and either of the received contract data elements or the representation thereof to the other entity.

A still further feature provides, if the received contract data elements are the same as the accessed contract data elements, for transmitting the digital signature and either of the contract data elements or the representation thereof to the other entity to include: generating a digital signature associated with the accessed contract data elements by digitally signing the accessed contract data elements or a representation thereof using the encryption key associated with the entity; and transmitting the digital signature, the originating entity digital signature and either of the accessed contract data elements or the representation thereof to the other entity.

Yet further features provide for receiving the contract data elements from another entity to include receiving the contract data elements or a representation thereof together with at least an originating entity signature, and for the method further to include: validating digital signatures received together with the contract data elements or representation thereof, including validating the originating entity digital signature; and, storing the contract data elements or the representation thereof in association with the originating entity digital signature if the originating entity digital signature is valid.

Further features provide for validating the contract data elements using a schema-based validation algorithm to use a predetermined contract schema associated with the contract identifier; and for the method to include retrieving the contract schema associated with the contract data elements.

Still further features provide for the representation of the contract data elements to be an obfuscation of the contract data elements, for the method to include obfuscating and de-obfuscating the contract data elements, and for the obfuscation and de-obfuscation of the contract data elements to use an obfuscation/de-obfuscation key.

A yet further feature provides for the contract data elements to be de-obfuscated responsive to receiving the contract data elements from another entity and obfuscated prior to transmission to another entity.

Further features provide for the contract data elements to be transmitted and received to and from other entities, and stored by the entity, by way of a digital contract envelope; for the digital contract envelope to be configured to include one or more of the group of: the contract data elements or the representation thereof; digital signatures of the entities establishing the contract; and a stamp configured for implementing protocol maintenance functions.

A still further feature provides for transmitting the digital signature, the originating entity digital signature and either of the contract data elements or the representation thereof to the other entity when the received contract data elements are the same as the accessed contract data elements to include: updating a previously stored digital contract envelope including the originating entity digital signature and being associated with the contract data elements to include the digital signature generated by the entity; determining whether the updated digital contract envelope is complete or incomplete; and, if the digital contract envelope is complete, forwarding the contract data elements to a deal processing component associated with the entity and transmitting the updated digital contract envelope to each entity being party to the contract; or, if the digital contract envelope is incomplete, determining a next entity to whom the digital contract envelope is to be transmitted and transmitting the updated digital contract envelope to the next entity.

A yet further feature provides for determining whether the updated digital contract envelope is complete or incomplete to include: checking that the contract data elements validation was successful; using the contract schema to determine whether digital signatures of each entity party to the contract are included in the updated digital contract envelope; and checking that all the contract data elements are furnished according to requirements of the contract schema.

The method repeats up to a time when the contract data elements, or a representation thereof, have valid digital signatures of all entities party to the contract, at which time the contract becomes binding.

Further features provide for a subset of the contract data elements to be redacted such that the subset of the contract data elements is kept confidential or otherwise withheld from one or more entities who are party to the contract.

In accordance with a further aspect of the invention there is provided a system including a computing device associated with an entity comprising: a processor and a memory configured to provide computer program instructions to the processor to execute functions of components; a contract data elements receiving component for receiving a set of contract data elements relating to a contract to be established, the set of contract data elements being received from either one of: another entity; or, a deal negotiation component associated with the entity; a contract data elements validating component for validating the contract data elements using an associated contract schema and a schema-based validation algorithm; and, a contract data elements transmitting component for, if the contract data elements are valid, transmitting the contract data elements to the other of: the deal negotiation component; or, another entity, wherein when transmitting the contract data elements to another entity the contract data elements transmitting component is configured to: generate a digital signature associated with the contract data elements by digitally signing the contract data elements or a representation thereof using an encryption key associated with the entity; and, transmit the digital signature and either of the contract data elements or the representation thereof to the other entity.

A further feature provides for the computing device to include a querying component for, responsive to the contract data elements receiving component receiving the contract data elements from the deal negotiation component associated with the entity, querying a contract identifier field associated with the contract data elements, the contract identifier field being configured for storing a globally unique contract identifier.

A yet further feature provides for the computing device to include a contract instantiating component for, if the contract identifier field contains a null value: obtaining a contract identifier; associating the contract data elements with the contract identifier including updating the contract identifier field to include the obtained contract identifier; and, storing the contract data elements.

A still further feature provides for the computing device to include a contract updating component for, if the contract identifier field contains a contract identifier: accessing a set of contract data elements associated with the contract identifier and having been stored previously, the previously stored set of contract data elements having been stored in association with an originating entity digital signature, the originating entity digital signature having been generated by an originating entity digitally signing the previously stored set of contract data elements or a representation thereof using an encryption key associated with the originating entity; and, comparing the received contract data elements with the accessed contract data elements.

A further feature provides, if the received contract data elements are not the same as the accessed contract data elements, for the contract data elements transmitting component to be configured to: generate a digital signature associated with the received contract data elements by digitally signing the received contract data elements or a representation thereof using the encryption key associated with the entity; and, transmit the digital signature and either of the received contract data elements or the representation thereof to the other entity.

A still further feature provides, if the received contract data elements are the same as the accessed contract data elements, for the contract data elements transmitting component to be configured to: generate a digital signature associated with the accessed contract data elements by digitally signing the accessed contract data elements or a representation thereof using the encryption key associated with the entity; and transmit the digital signature, the originating entity digital signature and either of the accessed contract data elements or the representation thereof to the other entity.

Yet further features provide for the contract data elements receiving component to be configured to receive the contract data elements or a representation thereof from another entity together with at least an originating entity signature, and for the computing device to include: a digital signature validating component for validating digital signatures received together with the contract data elements or representation thereof, including validating the originating entity digital signature; and, a storing component for storing the contract data elements or the representation thereof in association with the originating entity digital signature if the originating entity digital signature is valid.

Further features provide for the contract data elements validating component to use a predetermined contract schema associated with the contract identifier; and for the contract data elements validating component to include a contract schema retrieving component for retrieving the contract schema associated with the contract data elements.

Still further features provide for the representation of the contract data elements to be an obfuscation of the contract data elements, for the computing device to include an obfuscation/de-obfuscation component for obfuscating and de-obfuscating the contract data elements, and for the obfuscation/de-obfuscation component to use an obfuscation/de-obfuscation key.

A yet further feature provides for the obfuscation/de-obfuscation component to de-obfuscate the contract data elements responsive to receiving the contract data elements from another entity and to obfuscate the contract data elements prior to transmission to another entity.

Further features provide for the computing device to include a digital contract envelope component for generating a digital contract envelope configured for transmitting and receiving contract data elements to and from other entities, and for storing the contract data elements by the entity; for the digital contract envelope to be configured to include one or more of the group of: the contract identifier; the contract data elements or the representation thereof; digital signatures of the entities establishing the contract; and a stamp configured for implementing protocol maintenance functions.

A still further feature provides for the digital contract envelope component to be configured, responsive to the contract updating component determining that the received contract data elements are the same as the accessed contract data elements, to: update a previously stored digital contract envelope including the originating entity digital signature and being associated with the contract data elements to include the digital signature generated by the entity; determine whether the updated digital contract envelope is complete or incomplete; and, if the digital contract envelope is complete, forward the contract data elements to a deal processing component associated with the entity and transmit the updated digital contract envelope to each entity being party to the contract; or, if the digital contract envelope is incomplete, determine a next entity to whom the digital contract envelope is to be transmitted and to transmit the updated digital contract envelope to the next entity.

A yet further feature provides for the digital contract envelope component to determine whether the updated digital contract envelope is complete or incomplete by: checking that the contract data elements validation was successful; using the contract schema to determine whether digital signatures of each entity party to the contract are included in the updated digital contract envelope; and checking that all the contract data elements are furnished according to requirements of the contract schema.

Further features provide for a subset of the contract data elements to be redacted such that the subset of the contract data elements is kept confidential or otherwise withheld from one or more entities who are party to the contract.

In accordance with a further aspect of the invention there is provided a computer program product comprising a computer-readable medium having stored computer-readable program code for causing a computing device associated with an entity to perform the steps of: receiving a set of contract data elements relating to a contract to be established, the set of contract data elements being received from either one of: another entity; or, a deal negotiation component associated with the entity; validating the contract data elements using an associated contract schema and a schema-based validation algorithm; and, if the contract data elements are valid, transmitting the contract data elements to the other of: the deal negotiation component; or, another entity, wherein transmitting the contract data elements to another entity includes: generating a digital signature associated with the contract data elements by digitally signing the contract data elements or a representation thereof using an encryption key associated with the entity; and, transmitting the digital signature and either of the contract data elements or the representation thereof to the other entity.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

A protocol-based system and method for establishing a multi-party contract are described. The described system and method may facilitate the establishment of an inter-company transaction agreement (hereafter a "contract"). A "contract controller" protocol element (termed a contract controller component) may be provided to facilitate real-time contract negotiations, with little to no human intervention. As will be explained below, the described system and method may further facilitate contract negotiations and the establishment of contracts which are not capable of being repudiated by the entities who are party thereto. The system and method may be protocol based in that they define a set of rules governing the exchange or transmission of data between devices and, in particular, as to how contract data elements are to be exchanged, validated and incorporated into a contract.

Figure 1:
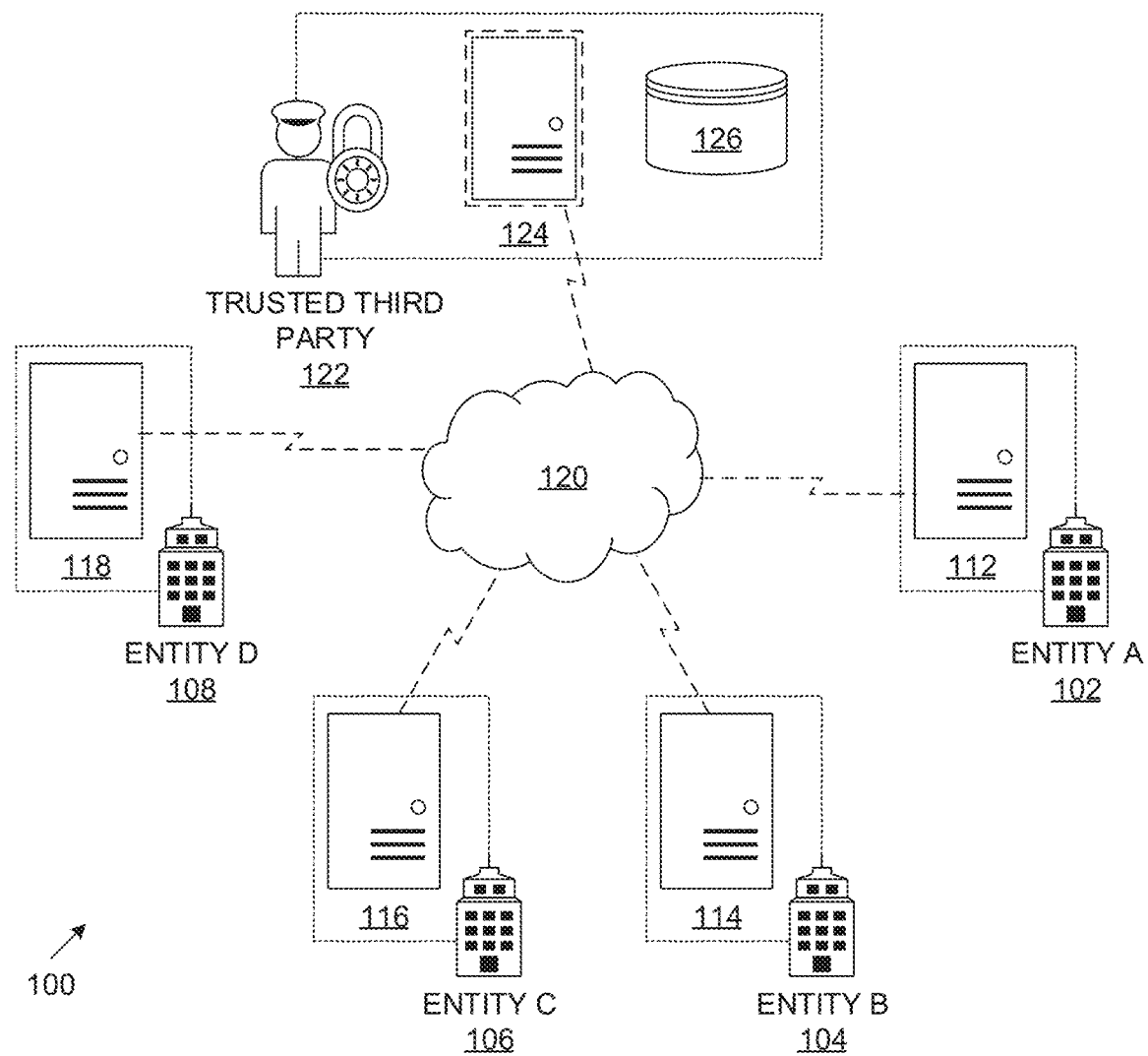
FIG. 1 is a schematic diagram which illustrates an exemplary protocol-based system for establishing a multi-party contract.

FIG. 1 is a schematic diagram which illustrates an exemplary protocol-based system (100) for establishing a multi-party contract. The system may be used by a number of entities (102, 104, 106, 108), each of whom has access to or maintains a computing device (112, 114, 116, 118) configured for the negotiation and establishment of contracts.

The computing devices (112, 114, 116, 118) may be configured to communicate with one another by way of an appropriate communication network (120), such as the Internet. In some implementations the computing devices (112, 114, 116, 118) may be configured to establish a secure communication link with one another to enable secure communications. The secure communication link may be configured to guarantee the identity of the sending and receiving entity (e.g. using mutual secure sockets layer or the like).

Each of the computing devices (112, 114, 116, 118) may provide a deal negotiation component configured for automatic negotiation of contracts (i.e. with little to no human intervention) and a deal processing component configured for processing contracts that have been successfully negotiated. The deal negotiation component may be configured to implement custom logic (e.g. premium calculation, authorization workflows, etc.) to facilitate the negotiation of a particular contract while the deal processing component may be configured to process and/or implement a successfully negotiated contract (which once completed may be termed a "deal"). Each of the computing devices (112, 114, 116, 118) may further provide a contract controller component, described in greater detail below, which may be configured to create mutually binding contracts between selected entities according to the terms negotiated by the various deal negotiating components.

The system (100) may also include a trusted third party (122). The trusted third party (122) may have access to or maintain a secure computing device (124) and may maintain a contract database (126) configured for storing, organising and providing access to information associated with the various contracts described herein. The contract database (126) may be a secure database and access thereto may be restricted. In some implementations the secure computing device (124) may act as a gateway, controlling access to information stored in the contract database (126) and refusing connections with entities who are not authorised and/or registered with the system (100). In some implementations, the trusted third party (122) may be responsible for creating and managing globally unique contract identifiers, schema identifiers, etc. and securely distributing contract schemas and obfuscation/de-obfuscation keys (and/or associated key identifiers) to appropriate entities. In some cases the trusted third party (122) may be configured to digitally sign contract schemas so that contract controller components described herein may be able to test the integrity of the contract schema at any time by validating the trusted third party signature.

The trusted third party (122) may also manage entity registrations with the system (100) and may be responsible for creating, distributing and revoking digital certificates used by the respective entities as described herein. In some implementations the trusted third party (122) may provide a contract data element escrow service in terms of which the trusted third party ensures that a subset of the contract data elements are kept confidential or otherwise withheld until such time as they are required to be known. The trusted third party (122) may be able to keep confidential the relevant contract data elements in a manner in which it can be proved that these contract data elements were present at the time of signing the original contract. This may be achieved by redacting a subset of contract data elements required to be kept confidential (e.g. by means of encryption) and only sharing a key for reversing the redaction upon a predetermined condition being met.

Figure 2:
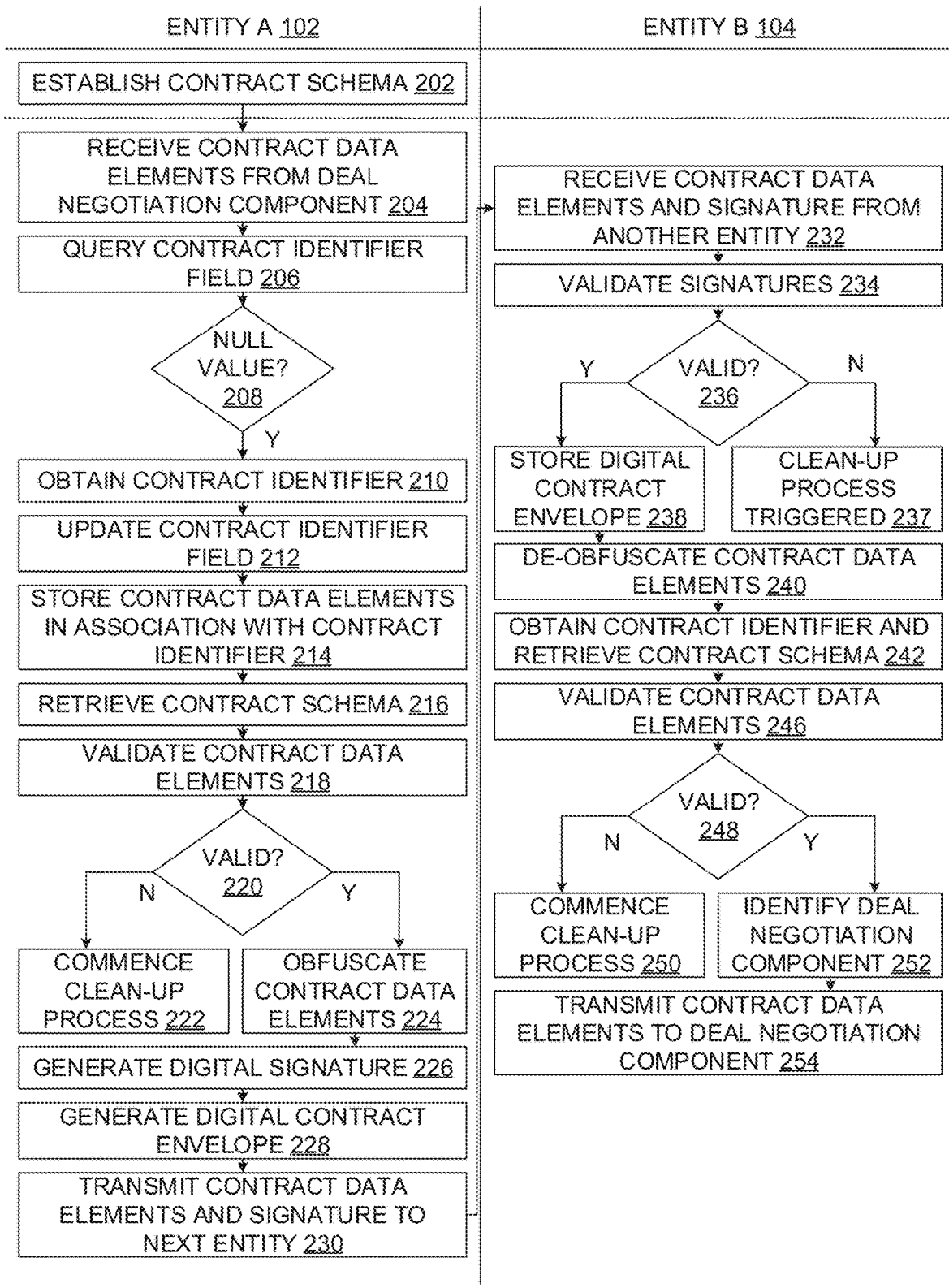
FIG. 2 is a swim-lane flow diagram which illustrates an exemplary protocol-based method for establishing a multi-party contract.

The system (100) described above may implement a protocol-based method for establishing a multi-party contract. FIG. 2 is a swim-lane flow diagram which illustrates an exemplary protocol-based method for establishing a multi-party contract in which respective swim-lanes delineate functions, steps, operations or procedures performed by respective entities. The method illustrated in FIG. 2 is continued in the flow diagram of FIG. 3. The described functions, steps, operations or procedures described with reference to FIGS. 2 and 3 may be performed by the computing device of the respective entity. More specifically, the described functions, steps, operations or procedures may be performed by the contract controller component executing on or otherwise provided by the computing device of the respective entities.

The method is described with reference to only two entities, hereafter entity A (102) and entity B (104), although it should be appreciated that the method can be extended mutatis mutandis to many more entities in a multi-party contract.

For the purpose of illustration, the method is described with reference to a scenario in which entity A (102) is a retail bank having entered into an agreement to on-sell life insurance provided by entity B (104), an insurance provider, to clients of entity A (102). It should however be appreciated that the method may be extended to any suitable scenario in which a contract between entities is required to be established with little or no human intervention. The entities (102, 104) may have established a framework agreement covering high-level details of the agreement.

As described herein, a contract may include a number of "contract data elements" which generally make up the content of the contract. The contract data elements may include particulars of parties to or subjects of the contract, terms of the contract and the like. At least some of the contract data elements may be negotiated at least partially without human intervention by deal negotiation components.

In some implementations, the contract data elements may include "indexes". Indexes may include the set of "index names" and "index values". The indexes may be configured for inclusion in a digital contract envelope so as to be accessible to third parties. This may enable particular digital contract envelopes associated with particular indexes to be searched for and accessed from a database in which they are stored. Including the indexes in the digital contract envelope may obviate the need to open or de-obfuscate contract data elements stored in each of the stored envelopes.

This may reduce high processing overheads that may be associated with de-obfuscating contract data elements of a plurality of digital contract envelopes in order to find contract elements of interest. It may also improve confidentiality as the party storing the envelopes does not have access to the de-obfuscated contract data elements. Having an index name such as "sign_location" and index value of "Stellenbosch" may for example make it possible to find all the contracts signed in Stellenbosch without having to de-obfuscate (or decrypt) all contracts to see where they have been signed.

Such index names and values may be included in contract envelopes (described in greater detail below). In cases where the contract date elements are obfuscated by the entities who are party to the contract to prevent other entities from becoming privy to the contents thereof, including the indexes in the contract envelope will make the indexes visible outside the obfuscated contract data elements. Doing so may allow third parties, who are not party to the contract, to be able to store and retrieve (obfuscated) contracts that satisfy certain requirements without needing to be privy to the whole contract.

Entity A (102) may establish (202) a contract template that will be completed for each insured life. The contract template, hereafter referred to as "contract schema", may be defined as a schema definition and may contain enough information to electronically validate the contents of a contract. The contract schema may thus include a formal definition of the attributes and structure of valid data. Any appropriate schema definition may be used, such as the extensible mark-up language (XML) schema, JavaScript™ object notation (JSON) schema or the like. The contract schema may provide an appropriate vocabulary that allows computer-implemented annotation and validation of contracts and/or may be used to express a set of computer-readable rules to which a contract must conform in order to be considered "valid" according to that contract schema. Each contract schema may be associated with a schema identifier which uniquely identifies that contract schema. The schema identifier may be referenced within the contract data elements (e.g. may be included in the contract data elements). This may allow one contract controller component to handle multiple schemas, in some implementations possibly with different deal negotiation components. In some cases, the contract schema may reference the framework agreement and a framework agreement identifier may be required to be included in the contract data elements signed by each entity party to the contract. The contract schema may be configured to be parsed or used by a schema-based validation algorithm in order to validate the contract. The contract schema and associated schema-based validation algorithm may thus enable testing of contract data for validity against certain predefined rules or conditions.

In some implementations, the contract schema may be configured to validate a contract in which at least a subset of the contract data elements are redacted. This may allow for aspects of the contract data elements to be kept confidential until such time as they are required to be known by all parties. Redaction of contract data elements is discussed in greater detail below.

The schema-based validation algorithm may be configured to determine whether the contract is complete, incomplete or invalid. A complete contract may be one for which all of the requirements of the contract schema have been met (e.g. all mandatory information has been provided). An incomplete contract may be one for which some mandatory information is still outstanding (but no requirements have been violated). An invalid contract may be one for which some of the information is contradictory to the requirements of the contract schema (i.e. some or all of the requirements have been violated). The schema-based validation algorithm may be uniquely associated with the contract schema and the schema identifier.

Establishing (202) the contract schema may include generating a globally unique schema identifier capable of uniquely identifying the contract schema. In some implementations, establishing (202) the contract schema may include generating an associated obfuscation/de-obfuscation key for use in obfuscating or de-obfuscating contract data elements. The obfuscation/de-obfuscation key may be unique to one or more of the schema identifier, the contract identifier, any appropriate reference in the contract, or the entity.

Establishing (202) the contract schema may include securely distributing or otherwise making available the contract schema, schema identifier and/or obfuscation/de-obfuscation key to the entities who will be party to the transaction. For example, the contract schema, schema identifier and/or obfuscation/de-obfuscation key may be transmitted to the trusted third party (122) which may in turn only permit the appropriate entities to access the contract schema and/or obfuscation/de-obfuscation key from the database (126), or using another appropriate secure distribution mechanism.

In other implementations, entity B (104) may establish the contract schema, the entities may establish the contract schema together or the entities may obtain a pre-established contract schema from the trusted third party (122).

A deal negotiation process may then follow. This may include the contract controller component associated with entity A (102) receiving (204) a set of contract data elements relating to the contract to be established. The contract data elements may be received from the deal negotiation component associated with entity A (102). As explained in greater detail below, in some implementations a subset of the contract data elements may be redacted in order to keep confidential or otherwise withhold such contract data elements from some or all of the parties to the contract.

The procedures, steps, operations or functions performed by the contract controller component upon receiving contract data elements from a deal negotiation component associated with the same entity may be referred to as an "inward flow" as the contract data elements move into the contract controller component from the relevant deal negotiation component.

In this exemplary life insurance scenario, the contract schema may define fields for one or more of the group of the name of the insured life, the birthdate of the insured life, the insured amount, the monthly premium, a contract identifier, identifiers of the entities who are parties to the contract, a schema identifier, a framework agreement identifier and the like. In some implementations, described in greater detail below, the fields may include indexes, such as index name and index value.

The set of contract data elements may for example, at this stage, include the name of the insured life, the birthdate of the insured life the insured amount, identifiers of entity A and entity B, the schema identifier and the framework agreement identifier. In some implementations, the contract data elements may include an index name (e.g. "Region") and index value (e.g. "South Africa"). The contract identifier and monthly premiums may contain null values. It should of course be appreciated that the fields defined by the contract schema and corresponding contract data elements may differ for different implementations of the described system and method. In some implementations, a subset of the contract data elements may be redacted.

The contract controller component associated with entity A (102) may then query (206) a contract identifier field associated with the contract data elements. If (208) the contract identifier field contains a contract identifier, this may indicate that the contract associated with the contract identifier has already been processed as part of an "outward flow" and steps, operations, etc. corresponding to those described below with reference to FIG. 3 may be taken or performed.

If (208) the contract identifier field contains a null value, the contract controller component associated with entity A (102) may obtain (210) a contract identifier. The obtained contract identifier may be generated by entity A (102) or requested and received from the trusted third party (122). The contract identifier may unique identify the contract (e.g. in this case the insurance of the life identified in the contract data elements). The contract controller component associated with entity A (102) may update (212) the contract identifier field to include the obtained contract identifier and may store (214) the contract data elements and contract identifier in association with one another. The contract controller component associated with entity A (102) may also associate one or more of the schema identifier, a key identifier and the framework agreement identifier with the contract identifier such that the contract schema, framework agreement, obfuscation/de-obfuscation key, etc. can subsequently be retrieved using the contract identifier.

The contract controller component associated with entity A (102) may retrieve (216) the contract schema. Retrieving (216) the contract schema may include retrieving the contract schema from a secure storage location, such as the trusted third party database (126), a secure database maintained by entity A (102) or the like and may use the contract identifier and/or the schema identifier. In some implementations retrieving (216) the contract schema may include retrieving associated information, such as an obfuscation/de-obfuscation key (described in greater detail below). In some implementations, the contract schema may be signed by the trusted third party and retrieving (216) the contract schema may include validating the trusted third party signature in order to test the integrity of the contract schema.

The contract controller component associated with entity A (102) may validate (218) the contract data elements using a schema-based validation algorithm. As described above, the schema-based validation algorithm may use the contract schema associated with the contract identifier to determine whether the contract data elements are valid (i.e. either complete or incomplete) or invalid.

Validating the (218) the contract data elements using the schema-based validation algorithm may include comparing the contract data elements to the associated contract schema. This may include validating respective data elements of the contract data elements against corresponding rules for that data element defined in the contract schema. For example, the contract data elements may include a filed "name" and validating the contract data elements may include checking that the data included in this field complies with the associated rules (e.g. that characters of an appropriate alphabet are used). As another example, the contract schema may define rules for the data element 'age' as being an integer larger or equal to zero and less than 200". Thus any input in association with an age field may be tested against the contract schema using the schema-based validation algorithm to determine whether a valid age was provided. The contract schema may thus define rules or conditions in a machine readable format and the schema-based validation algorithm may be configured to evaluate a contract data element against its corresponding rule or condition.

If (220) the contract data elements are invalid, the contract data elements are voided and a void contract clean-up process may commence (222). If (220) the contract data elements are valid, the process continues. In some implementations, the contract data elements may be obfuscated (224) prior to transmission to the next entity. Obfuscation (224) of the contract data elements may use the obfuscation/de-obfuscation key associated with the contract identifier and/or contract schema. The obfuscation/de-obfuscation key may be associated with a key identifier and may be stored in association with the contract identifier and/or contract schema and may have been retrieved using the key identifier.

Obfuscation (224) of the contract data elements may reversibly transform the contract data elements such that they are not readable or discernible, by man or machine, without first performing a de-obfuscation operation (which may require knowledge of the obfuscation/de-obfuscation key). In some implementations, obfuscation (224) of the contract data elements may include encrypting the contract data elements, where the obfuscation/de-obfuscation key serves as the encryption/decryption key. The obfuscated contract data elements may however be verifiable (e.g. by way of a digital signing process) to thereby enable third parties to verify the obfuscated contract data elements, and in turn the contract data elements, without having knowledge of the contract data elements (i.e. without compromising any confidentiality of the contract data elements). To achieve this, the obfuscation process may be configured to reliably produce the same obfuscated output for the same input, where the same key is used. Similarly, the de-obfuscation process may be configured to reliably produce the same de-obfuscated output for the same obfuscated input, using the same key. This may enable a digital signature-based validation process to be able to validate obfuscated contract data elements.

The contract controller component associated with entity A (102) may generate (226) a digital signature ("entity A digital signature") associated with the contract data elements by digitally signing the contract data elements or the representation thereof (i.e. the obfuscated contract data elements) using an encryption key associated with entity A (102). The encryption key used for generating the digital signature may be a private key issued to or generated by entity A (102) for the purpose of digitally signing contract data elements or representations thereof and may be associated with a corresponding public key which may be used by other entities to validate the digital signature. In some implementations, the private and public key pair may be associated with a digital certificate issued to entity A (102) by the trusted third party (122) or another certificate authority to thereby enable other entities to validate the public key usable in verifying the digital signature.

The contract controller component associated with entity A (102) may generate (228) a digital contract envelope configured for transmitting and receiving the contract data elements between respective entities. The digital contract envelope may be configured to include one or more of the group of: the schema identifier, the key identifier, the contract identifier; the contract data elements or the representation thereof (i.e. obfuscated contract data elements); digital signatures of the entities establishing the contract (i.e. entity A digital signature at this stage); and a stamp configured for implementing protocol maintenance functions. In some implementations, particularly where the contract data elements are obfuscated, the envelope may not include the schema identifier or the contract identifier. Generating (228) the digital contract envelope may include cross-checking the entities in the contract. This may provide assurance that the entities in the digital contract envelope correspond to those that are party to the contract.

In some implementations the obfuscated contract data elements may be signed to enable independent third parties to attest to the validity of the deal and the binding signatures of the various entities who are party to the contract without needing to be privy to the content of the contract data elements. In some cases, for the duration of the validity of the deal, the digital contract envelope may be required to be stored together with the obfuscation/de-obfuscation key and the contract schema in order to prove at a later date the validity and/or authenticity of the contract. This may enable public (or even blockchain-based) storage of the envelopes to bring the attestation of the deals into a wider domain without sacrificing the confidentiality of the deal itself.

The stamp may be an object or collection of data elements used by the contract controller component to implement protocol maintenance functions such as one or more of the following: limiting the maximum number of hops between contract controller components of respective entities during the deal negotiation process and/or the lifetime of the contract; limiting the maximum total time (e.g. in the order of minutes, hours or days) allowed for the negotiation process; implementing safeguards against replay attacks where contracts are sent or received multiple times (e.g. by incorporating and verifying a nonce); and the like.

The contract controller component associated with entity A (102) may transmit (230) contract data elements and the entity A digital signature to the next entity. In some cases the contract data elements and the entity A digital signature may be transmitted in the digital contract envelope. In the described implementation, the digital contract envelope may be transmitted (230) to the next entity, in this case being entity B (104). The digital contract envelope may include one or more of the group of the contract identifier, the schema identifier, the key identifier, contract data elements or representation thereof, entity A digital signature and the stamp. The digital contract envelope may be transmitted from entity A (102) to entity B (104) via a secure communication link which may be established between the entities prior to transmitting the envelope. Obfuscating the contract data elements may however obviate the need for a secure communication link.

It should be appreciated that operations (204) to (230) may be executed or performed within a few seconds or even within a few milliseconds or less.

The contract controller component associated with entity B (104) may receive (232) the contract data elements and entity A digital signature from entity A (102). In the described implementation, this may include receiving the digital contract envelope from entity A (102). The procedures, steps, operations or functions performed by the contract controller component upon receiving contract data elements from another entity may be referred to as an "outward flow" as the contract data elements move out from the contract controller component into the relevant deal negotiation component.

The contract controller component associated with entity B (104) may validate the stamp and may perform housekeeping functions based on the stamp data to determine whether or not the envelope should be discarded or processed further. Validating the stamp may include validating a nonce included in the stamp.

The contract controller component associated with entity B (104) may validate (234) the signatures included in the digital contract envelope. In the exemplary scenario being described, validating (234) the digital signatures includes validating the entity A digital signature, in this context being an originating entity digital signature in that it is the digital signature of the entity from whom the digital contract envelope is received. However in another scenario more digital signatures may be present and each of these digital signatures may be validated. Validating (234) digital signatures may include using a public key associated with the digital signature to decrypt the digital signature to obtain decrypted contract data elements or the representation thereof and then comparing the decrypted contract data elements or representation thereof to the contract data elements or representation thereof, as the case may be, which is included in the digital contract envelope.

Any signatures that are not valid (e.g. where the decrypted contract data elements do not match those included in the digital contract envelope) are discarded. If (236) the signature of the originating entity (i.e. the entity having transmitted the digital contract envelope to entity B, in this case being entity A) is not valid, or not present, then the envelope may be discarded and a clean-up process may be triggered (237). If (236) the originating entity digital signature is valid, the contract controller component associated with entity B (104) may store (238) the digital contract envelope (or at the very least the received contract data elements or representation thereof in association with entity A digital signature).

In some implementations, the contract data elements may be obfuscated and the contract controller component associated with entity B (104) may de-obfuscate (240) the obfuscated contract data elements to obtain de-obfuscated contract data elements. De-obfuscation (240) of the contract data elements may use the obfuscation/de-obfuscation key associated with the key identifier, contract identifier and/or contract schema. In some implementations, de-obfuscating the contract data elements may perform a decryption operation, with the obfuscation/de-obfuscation key serving as a decryption key. The obfuscation/de-obfuscation key may be obtained using a key identifier included in the contract envelope. In other implementations the obfuscation/de-obfuscation key may be otherwise known to entity B.

The contract controller component associated with entity B (104) may obtain the contract identifier and/or schema identifier from the contract data elements and retrieve (242) the contract schema using one of the obtained identifiers. Retrieving (242) the contract schema may include retrieving the contract schema from a secure storage location, such as the trusted third party database (126), a secure database maintained by entity A (102) or entity B (104) or the like. In some implementations retrieving (242) the contract schema may include retrieving associated information. In some implementations, the contract schema may be signed by the trusted third party and retrieving (242) the contract schema may include validating the trusted third party signature in order to test the integrity of the contract schema.

The contract controller component associated with entity B (104) may validate (246) the contract data elements using the schema-based validation algorithm. As described above, the schema-based validation algorithm may use the contract schema associated with the contract identifier to determine whether the contract data elements are valid (i.e. either complete or incomplete) or invalid. If (248) the contract data elements are invalid, the contract data elements are voided and a void contract clean-up process may commence (250).

If (248) the contract data elements are valid, the process continues. This may include identifying (252) an appropriate deal negotiation component associated with entity B (104)

and transmitting (254) the contract data elements to the identified deal negotiation component for one or more of evaluation of the contract data elements and computation or determination of further data elements. The deal negotiation component may use the received contract data elements to compute updated or further contract data elements for consideration by other entities who are party to the contract.

It should be appreciated that any information in a set of contract data elements which violates the appropriate contract schema, when processed in an outward flow, may be considered to represent a contract voiding action. This means that any of the entities who are party to the contract can decide to void the contract at any stage prior to conclusion and use this mechanism (i.e. the inclusion of invalid data elements) to notify all other entities of this fact.

It should be appreciated that operations (232) to (254) may be executed or performed within a few seconds or even within a few milliseconds or less.

Figure 3:
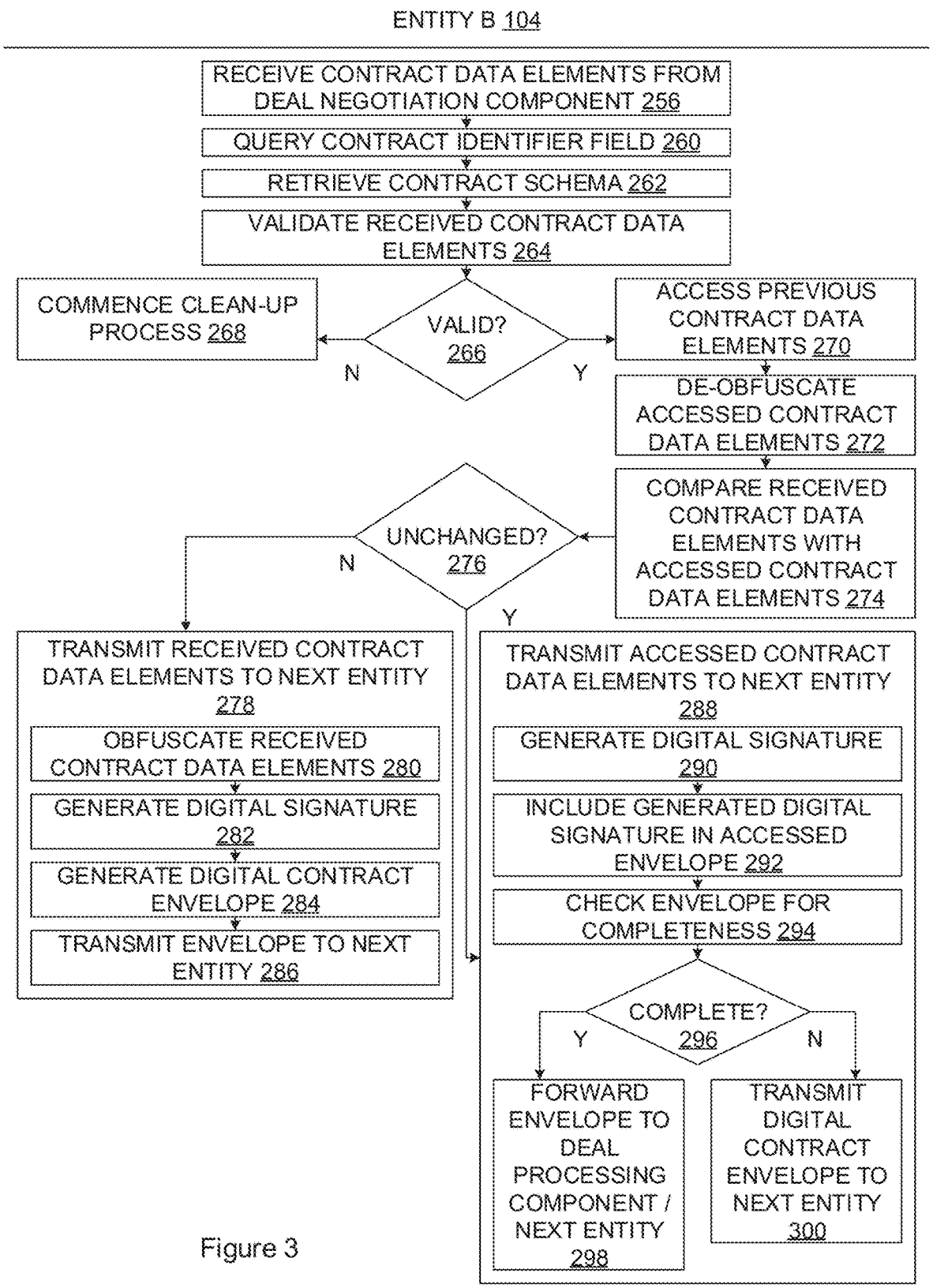
FIG. 3 is a flow diagram in which the method described with reference to FIG. 2 is continued.

Once the deal negotiation component has processed and optionally updated the contract data elements, an inward flow at entity B may commence and, continuing on to FIG. 3, the contract controller component associated with entity B (104) may receive (256) a set of contract data elements from the deal negotiation component associated therewith.

The contract controller component associated with entity B (104) may query (260) one or both of a contract identifier field and a schema identifier field associated with or included in the contract data elements to obtain a contract identifier and/or schema identifier associated with the contract data elements and may retrieve (262) the contract schema using one of the obtained identifiers. Retrieving (262) the contract schema may include retrieving the contract schema from a secure storage location, such as the trusted third party database (126), a secure database maintained by entity A (102) or entity B (104) or the like. In some implementations retrieving (262) the contract schema may include retrieving associated information, such as the obfuscation/de-obfuscation key.

The contract controller component associated with entity B (104) may validate (264) the received contract data elements using a schema-based validation algorithm. As described above, the schema-based validation algorithm may use the contract schema associated with the contract identifier to determine whether the contract data elements are valid (i.e. either complete or incomplete) or invalid. If (266) the contract data elements are invalid, the contract data elements are voided and a void contract clean-up process may commence (268).

If (266) the contract data elements are valid, the process continues. The contract controller component associated with entity B (104) may for example access (270) a previous set of contract data elements (or a representation thereof) associated with the contract identifier. The previous set of contract data elements may have been stored in association with one or more digital signatures (at least the digital signature of the entity from whom the contract data elements were received, in this scenario being entity A digital signature). In some implementations, accessing (270) the previous set of contract data elements includes accessing the digital contract envelope in which the contract data elements and digital signatures were received. It should be appreciated that the digital signatures (in this case entity A digital signature) have been generated previously by digitally signing the previous set of contract data elements or a representation thereof using an encryption key associated with the relevant entity (i.e. entity A).

In some implementations, the accessed contract data elements may have been stored in an obfuscated format and the contract controller component associated with entity B (104) may de-obfuscate (272) the accessed contract data elements to obtain de-obfuscated contract data elements. De-obfuscation (272) of the accessed contract data elements may use the obfuscation/de-obfuscation key which may be associated with the contract identifier and/or contract schema. In some implementations, de-obfuscating the contract data elements may perform a decryption operation, with the obfuscation/de-obfuscation key serving as a decryption key.

The contract controller component associated with entity B (104) may compare (274) the contract data elements received from the deal negotiation component associated with entity B (104) with the contract data elements which are accessed (i.e. the previous contract data elements).

If (276) the received contract data elements are not the same as (or do not sufficiently correspond to) the accessed contract data elements (i.e. they have changed), the contract controller component associated with entity B (104) may transmit (278) the received (as opposed to the accessed) contract data elements to the next appropriate entity. In such a case all of the signatures associated with the accessed contract data elements (e.g. entity A digital signature) may be abandoned or discarded as these no longer relate to the most up-to-date contract data elements.

Transmitting (278) the received contract data elements to the next appropriate entity may include obfuscating (280) the received contract data elements and generating (282) a digital signature ("entity B digital signature") associated with the received contract data elements by digitally signing the received contract data elements (i.e. the contract data elements received from the deal negotiation component associated with entity B) or the representation (e.g. obfuscation) thereof using an encryption key associated with entity B (104). The encryption key used for generating the digital signature may be a private key issued to or generated by entity B (104) for the purpose of digitally signing contract data elements or representations thereof and may be associated with a corresponding public key which may be used by other entities to validate the digital signature. In some implementations, the private and public key pair may be associated with a digital certificate issued to entity B (104) by the trusted third party (122) or another certificate authority to thereby enable other entities to validate the public key usable in verifying the digital signature.

Transmitting (278) the received contract data elements to the next appropriate entity may further include generating or updating (284) a digital contract envelope to include one or more of the group of: the contract identifier; schema identifier; key identifier; the received contract data elements or representation (i.e. obfuscation) thereof; entity B digital signature; and the stamp. Generating or updating (284) the digital contract envelope may include cross-checking the entities in the contract.

Transmitting (278) the received contract data elements to the next appropriate entity may further include updating the stamp data (e.g. with a new nonce), determining an appropriate next entity (in this exemplary scenario being entity A) and transmitting (286) the digital contract envelope, including the received (i.e. updated) contract data elements and entity B digital signature to entity A (102). The digital contract data elements may be transmitted via a secure communication link.

If (276) the received contract data elements are the same as (or do sufficiently correspond to) the accessed contract data elements (i.e. are unchanged), the contract controller component associated with entity B (104) may transmit (288) the accessed contract data elements (as opposed to the contract data elements received from the deal negotiation component associated with entity B) to the appropriate next entity. Transmitting (288) the accessed contract data elements may include transmitting the previously obfuscated contract data elements, i.e. the contract data elements may not be obfuscated again. This may avoid complications where obfuscation of the contract data elements does not reliably recreate the same output, which could cause the validation of the digital signatures to fail.

Transmitting (288) the accessed contract data elements may include generating (290) a digital signature ("entity B digital signature") associated with the accessed contract data elements. This may be in response to receiving (256) the contract data elements from the deal negotiation component. Generating (290) the digital signature associated with the accessed contract data elements may include digitally signing the accessed contract data elements or the representation (i.e. obfuscation) thereof using the encryption key associated with entity B (104).

The generated digital signature (i.e. entity B digital signature) may be included (292) in the digital contract envelope, which may have been accessed (270) previously. Including (292) entity B digital signature in the digital contract envelope may include retaining all of the valid digital signatures included in the digital contract envelope. In some cases the contract envelope may be digitally signed. Including the digital signature in the digital contract envelope may include cross-checking the entities in the contract.

It should be appreciated that the digital signature may be generated even if the contract data elements are incomplete. This may enable all entities who are party to the transaction to detect whether the contract has changed in any way since that entity has last reviewed it. This may be used, for example, to determine who the next destination party should be during the negotiation process.

The contract controller component associated with entity B (104) may check (294) the digital contract envelope for completeness. This may include checking that the contract data elements are complete, that validation was successful and using the contract schema to determine whether digital signatures of each entity party to the contract are included in the updated digital contract envelope. The envelope may be complete if the signatures of all of the entities party to the contract are valid and are included in the digital contract envelope. The full set of entities who are party to the contract may be identified in the contract data elements.

If (296) the digital contract envelope is complete, transmitting (288) the accessed contract data elements may include forwarding (298) the digital contract envelope to the deal processing component associated with entity B (104) and/or to each entity being party to the contract (in this case being entity A (102)) for on-forwarding to one or more of: their respective deal processing components, a trusted deal database or to a third party for storage thereat.

If (296) the digital contract envelope is not complete, transmitting (288) the accessed contract data elements may include determining a next entity to whom the digital contract envelope is to be transmitted (in this case entity A (102)). Transmitting (288) the accessed contract data elements may include transmitting (300) the updated digital contract envelope (or at least the valid digital signatures and either of the accessed contract data elements or the representation thereof) to the next entity. In the present scenario, the digital contract envelope may be transmitted to entity A (102) for further negotiation of the contract.

It should be appreciated that in some instances, an incomplete set of contract data elements may be included within a complete digital contract envelope. This may be considered a voided contract or a "stale mate" condition where none of the entities who are party to the contract wants to further contribute to drive the contract to completion.

It should be appreciated that operations (256) to (300) may be executed or performed within a few seconds or even within a few milliseconds or less. Rapid and automated contract negotiation may therefore be enabled with appropriate measures being taken to preclude as far as practically possible repudiation by one or more entities who are party to the contract.

Figure 4:
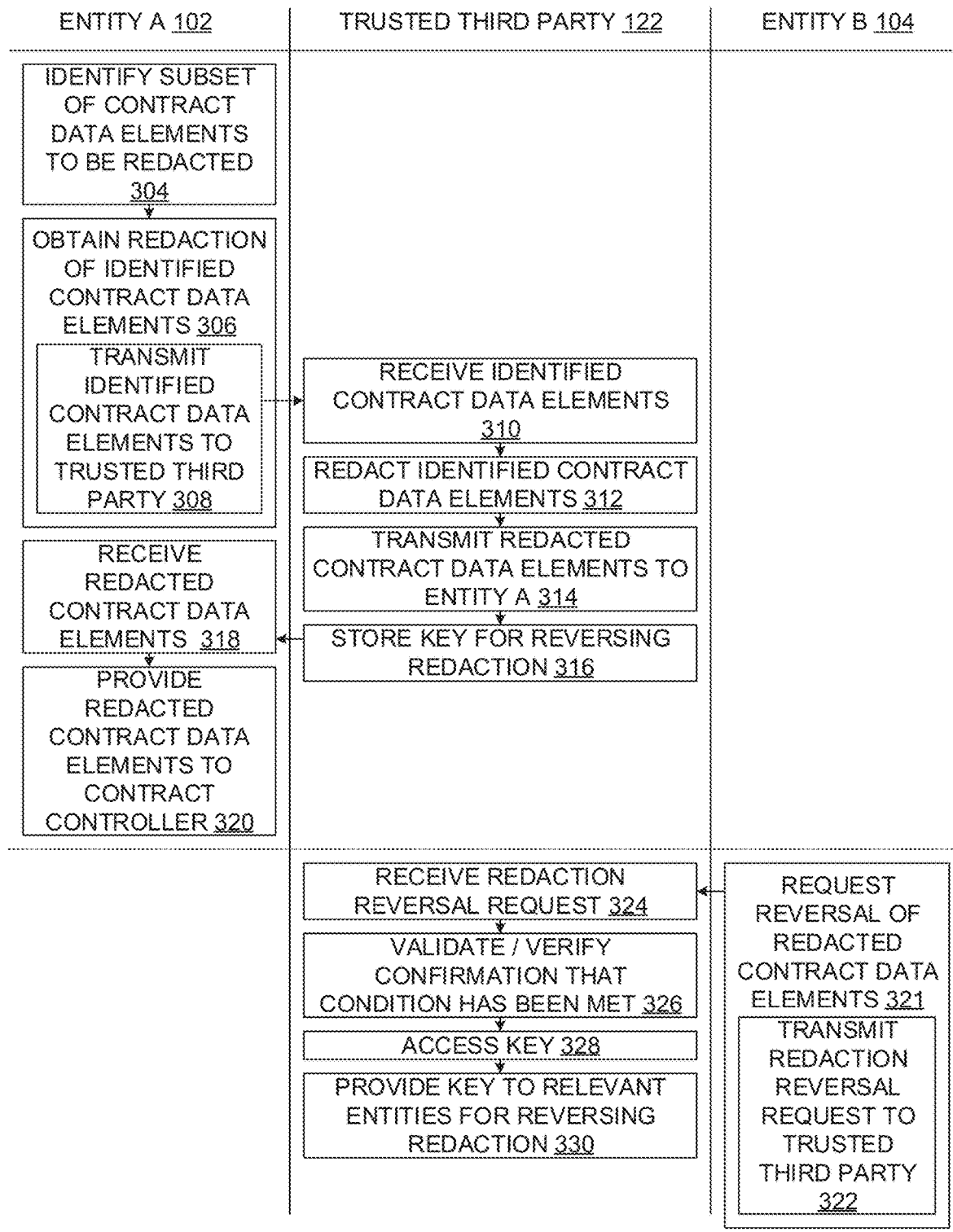
FIG. 4 is a swim-lane flow diagram which illustrates an exemplary method of enabling contract data element escrow functionality.

As mentioned, in some implementations a subset the contract data elements may be redacted such that the subset of the contract data elements is kept confidential or otherwise withheld from one or more entities who are party to the contract. In some implementations this may be in order to provide an identity escrow functionality in terms of which the identity of one or more parties to or subjects of the contract are not revealed to other parties until such time as such identity becomes relevant. FIG. 4 is a swim-lane flow diagram which illustrates an exemplary method of enabling contract data element escrow functionality in which respective swim-lanes delineate functions, steps, operations or procedures performed by respective entities.

The method of FIG. 4 elaborates on the exemplary scenario with reference to which FIGS. 2 and 3 are described in that personal details and contact information of the insured life (e.g. full name, identity number, email address, phone numbers, etc.) is required to be kept confidential (until, e.g., the occurrence of a pre-determined event).

For example, entity A (102), a retail bank having entered into an agreement to on-sell life insurance provided by entity B (104), an insurance provider, may wish to shield its clients (to whom life insurance will be sold) from entity B. This may be in order to comply with data protection requirements, to prevent entity B from contacting entity A's clients directly (and cutting entity A out) or the like. It should of course be appreciated that the method may be extended to any suitable scenario in which a subset of contract data elements are required to be withheld from one or more parties to the contract until occurrence of a predetermined event.

Before commencing the contract negotiation process described above with reference to FIGS. 2 and 3, entity A (102) may initiate a contract data element redaction procedure. This may include identifying (304) a subset of contract data elements to be redacted and obtaining (306) redaction of the identified subset of contract data elements. Obtaining (306) redaction of the identified subset contract data elements may include obtaining encrypted contract data and a corresponding key configured for decrypting the encrypted contract data elements. In some implementations, obtaining (306) redaction of the identified subset of contract data elements may include transmitting (308) the identified subset of contract data elements to the trusted third party (122) for redaction thereat.

The trusted third party (122) may receive (310) the identified subset of contract data elements and generate a key suitable for redacting the identified subset of contract data elements. In some implementations, the trusted third party (122) may encrypt (312) the identified subset of contract data elements using the key to obtain encrypted contract data elements. It should however be appreciated that any suitable means of redaction may be used, provided that redaction can be reversed using the key to obtain the subset of contract data elements again. In some cases the redacted subset of contract data elements may be configured such that they can be validated by contract controller components described herein using an appropriate schema-based validation algorithm. In other cases, this may be the responsibility of another component.

The trusted third party (122) may then transmit (314) the redacted subset of contract data elements to entity A (102) for inclusion in the contract. The trusted third party (122) may store (316) the key. Typically the redacted subset of contract data elements include encrypted contract data elements, while the key that is stored is the corresponding encryption key. However, in other implementations, "redacted subset of contract data elements" transmitted to entity A may be the encryption key while the "key" that is stored is the encrypted contract data elements.

The trusted third party (122) may sign the redacted subset of contract data elements using a digital certificate associated therewith so that entities who are party to the contract can verify the origin thereof (and accordingly that they relate to genuine data). In some implementations the stored key may be stored in association with a condition which must be met before the redacted subset of contract data elements will be released.

Entity A (102) may receive (318) the redacted subset of contract data elements from the trusted third party (122) and provide (320) the redacted subset of contract data elements to the contract controller component of entity A (120) for inclusion in the contract.

At some later stage, typically once the contract has been negotiated and signed by all relevant parties, the redacted subset of contract data elements may need to be revealed (e.g. in this scenario upon the death of the insured life). In some implementations this may include one of the entities (e.g. entity B (104)) requesting (321) reversal of the redaction of the subset of contract data elements. This may include transmitting (322) a redaction reversal request to the trusted third party (122). The redaction reversal request may include the redacted subset of contract data elements included in the contract and optionally an indication and/or confirmation that an associated condition has been met. In some implementations the requesting entity (e.g. entity B) may be required to prove that it is entitled to access the encrypted contract data elements.

The trusted third party (122) may receive (324) the redaction reversal request. In some cases the trusted third party (122) may validate or verify (326) the confirmation that the condition has been met (which may include prompting entity A for verification) and may then access (328) the key and provide (330) the key to the appropriate entities (e.g. entity B in this exemplary scenario) for reversing redaction of the subset of contract data elements (e.g. by decrypting the encrypted subset of contract data elements). This may enable the relying party (in this case entity B) to confirm for itself that the obtained contract data elements were in fact present in the original contract as signed.

It should be appreciated that in other embodiments, the functionality of the trusted third party described above may be provided by entity A.

Figure 5:
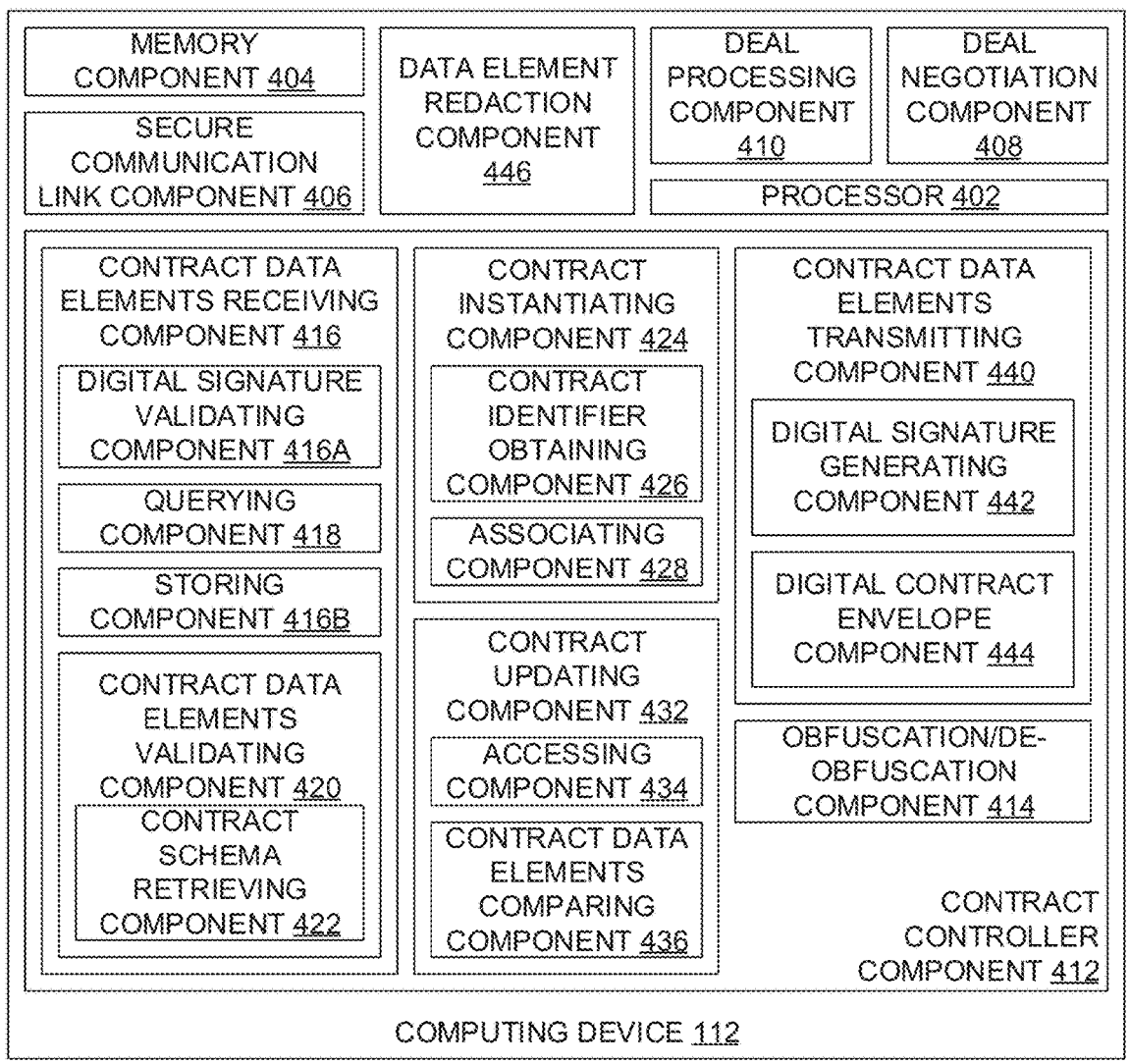
FIG. 5 a block diagram which illustrates components of an exemplary protocol-based system for establishing a multi-party contract.

FIG. 5 is a block diagram which illustrates components of an exemplary protocol-based system for establishing a multi-party contract. The system includes a computing device, in this exemplary scenario being the computing device (112) to which entity A (102) has access. It should be appreciated that the other computing devices (114, 116, 118) may be configured similarly to the computing device (112) of entity A (102).

The computing device (112) may include a processor (402) for executing the functions of components described below, which may be provided by hardware or by software units executing on the computing device (112). The software units may be stored in a memory component (404) and instructions may be provided to the processor (402) to carry out the functionality of the described components.

The computing device (112) may include a secure communication link component (406) arranged to establish a secure communication link with computing devices (114, 116, 118) of other entities by way of which contract data elements and other information and data may be transmitted and received. The secure communication link may be established via the communication network (120) and may be configured to guarantee the identity of the sending and receiving entity (e.g. using mutual secure sockets layer or the like).

The computing device (112) may include a deal negotiation component (408) configured for automatic negotiation of contracts (i.e. with little to no human intervention). The deal negotiation component (408) may be configured to implement custom logic to facilitate the negotiation of a particular contract. The deal negotiation component (408) may for example be programmed with a series of rules and conditions in accordance with which automatic negotiation of contracts may be enabled. In some cases, the deal negotiation component may include a machine learning component which may be configured to alter or optimise the rules and conditions based on historic negotiation and processing of contracts.

The computing device (112) may include a deal processing component (410) configured for processing contracts that have been successfully negotiated. The deal processing component (410) may be configured to process and/or implement a successfully negotiated contract.

The computing device (112) may further include a contract controller component (412) which, in conjunction with the deal negotiation component (408), may be configured to create mutually binding contracts between selected entities according to the terms negotiated by the various deal negotiating components.

The contract controller component (412) may include an obfuscation/de-obfuscation component (414) arranged to obfuscate and de-obfuscate contract data elements and optionally other data and information. The obfuscation/de-obfuscation component (414) may be configured to use an obfuscation/de-obfuscation key, which may be uniquely associated with a key identifier, contract identifier and/or a contract schema. The term "representation of the contract data elements" as used herein may refer to obfuscated contract data elements. In some implementations, obfuscating contract data elements may include encrypting the contract data elements. Similarly, de-obfuscating contract data elements may include decrypting encrypted contract data elements. The obfuscation/de-obfuscation component (414) may be configured to obfuscate contract data elements prior to transmission of the contract data elements to another entity and to de-obfuscate the contract data elements responsive to receiving the contract data elements from another entity.

The contract controller component (412) may include a contract data elements receiving component (416) which may be configured to receive a set of contract data elements relating to a contract to be established. It should be appreciated that the contract data elements may take on various different forms depending on the type of contract needing to be established. In some cases, the contract data elements may be complete in that they completely describe the nature and terms of the contract that is being established for review by other entities who are party to the contract and subsequent implementation/processing by respective deal processing components. In other cases, the contract data elements may be incomplete in that they require input from further entities who are party to the contract. The contract data elements receiving component (416) may be configured to receive contract data elements from either one of the deal negotiation component (408) or the computing device (114, 116, 118) of another entity.

The contract data elements receiving component (416) may be configured to receive the contract data elements or a representation thereof from another entity together with digital signatures of entities party to the contract (at least including an originating entity signature associated with the entity from whom the contract data elements are received). The contract data elements receiving component (416) may include a digital signature validating component (416A) configured to validate the digital signatures received together with the contract data elements and a storing component (416B) arranged to store the contract data elements or the representation thereof, optionally in association with the valid digital signatures.

The contract data elements receiving component (416) may include a querying component (418) which may be arranged to query one or more of a contract identifier field, a schema identifier field and a key identifier field associated with or included in the contract data elements. The contract identifier field may be configured for storing a globally unique contract identifier. The querying component (418) may be configured to query the contract identifier field in response to the contract data elements receiving component (416) receiving the contract data elements from one or both of the deal negotiation component (408) or the computing device of another entity.

The contract data elements receiving component (416) may include a contract data elements validating component (420) arranged to validate the received contract data elements using an associated contract schema and a schema-based validation algorithm. The contract data elements validating component (420) may use a predetermined contract schema associated with the contract identifier and may include a contract schema retrieving component (422) arranged to retrieve the contract schema associated with the contract data elements.

The contract controller component (412) may include a contract instantiating component (424). The contract instantiating component (424) may be called if the contract identifier field contains a null value and may include a contract identifier obtaining component (426) configured to obtain a contract identifier. The contract identifier obtaining component (426) may generate a globally unique contract identifier, request and receive the contract identifier from the trusted third party (122) or otherwise obtain the contract identifier. The contract instantiating component (424) may also include an associating component (428) configured to associate the contract data elements with one or more of the contract identifier, schema identifier and key identifier. Associating the contract data elements with the identifier(s) may include updating an appropriate field to include the obtained identifier(s), updating the trusted third party (122) and the like. The contract instantiating component (424) may use the storing component (416B) to store the contract data elements.

The contract controller component (412) may include a contract updating component (432). The contract updating component (432) may be called if the contract identifier field contains a contract identifier and may include an accessing component (434) which may be configured to access a set of contract data elements associated with the contract identifier and having been stored previously. In some cases (e.g. where contract data elements are received from another entity), the previously stored set of contract data elements may have been stored in association with, amongst others, an originating entity digital signature (i.e. the digital signature of the entity from whom the contract data elements are received). The originating entity digital signature may have been generated by an originating entity digitally signing the relevant contract data elements or a representation thereof using an encryption key associated with the originating entity. The contract updating component (432) may include a contract data elements comparing component (436) arranged to compare received contract data elements with accessed contract data elements.

The contract controller component (412) may include a contract data elements transmitting component (440) arranged to transmit the contract data elements to either the deal negotiation component (408) or the computing device (114, 116, 118) of another entity. The contract data elements transmitting component (440) may be configured to transmit the contract data elements only if the contract data elements validating component (420) determines the contract data elements to be valid. It should be appreciated that if the contract data elements are received from the deal negotiation component, the contract data elements transmitting component (440) will transmit the contract data elements to the computing device of the appropriate entity while if the contract data elements are received from the computing device of another entity, the contract data elements transmitting component (440) will transmit the contract data elements to the appropriate deal negotiation component (408).

The contract data elements transmitting component (440) may include a digital signature generating component (442). The digital signature generating component (442) may be configured to generate a digital signature associated with the contract data elements by digitally signing the contract data elements or a representation thereof using an encryption key associated with the entity (102). The digital signature may be included with transaction data elements that are transmitted to the relevant entity.

Depending on the output of the comparing component (436), the digital signature generating component (442) may either digitally sign the received contract data elements or the accessed contract data elements. If the comparing component (436) determines that the received contract data elements are not the same as the accessed contract data elements, the digital signature generating component (442) may generate a digital signature associated with the received contract data elements by digitally signing the received contract data elements or a representation thereof using the encryption key associated with the entity. I.e. the "new" or updated contract data elements will be signed. If the comparing component (436) determines that the received contract data elements are the same as the accessed contract data elements, the digital signature generating component (442) may generate a digital signature associated with the accessed contract data elements by digitally signing the accessed contract data elements or a representation thereof using the encryption key associated with the entity. The accessed contract data elements may be obfuscated and digitally signing the accessed contract data elements may include digitally signing the accessed obfuscated contract data elements. I.e. the contract data elements are not obfuscated again to avoid the digital signatures associated therewith from breaking.

The contract data elements transmitting component (440) may be configured to transmit to the relevant entity either the generated digital signature and the received contract data elements (or the representation thereof) or the generated digital signature as well as the digital signatures of the other entities (at least including the originating entity digital signature) and the accessed contract data elements (or the representation thereof).

The contract data elements transmitting component (440) may include a digital contract envelope component (444) arranged to generate a digital contract envelope configured for transmitting and receiving contract data elements to and from other entities, and for storing the contract data elements and associated information. The digital contract envelope may be configured to include one or more of the group of: the schema identifier; the key identifier; the contract identifier; the contract data elements or the representation thereof; digital signatures of the entities establishing the contract; and a stamp configured for implementing protocol maintenance functions.

The digital contract envelope component (444) may be configured to, responsive to the contract updating component (428) determining that the received contract data elements are the same as the accessed contract data elements, update a previously stored digital contract envelope associated with the contract data elements to include the digital signature generated by the digital signature generating component (442). The digital contract envelope component (444) may be configured to determine whether the updated digital contract envelope is complete or incomplete. The digital contract envelope component (444) may determine whether the updated digital contract envelope is complete or incomplete by using the contract schema to determine whether digital signatures of each entity party to the contract are included in the updated digital contract envelope.

If the digital contract envelope is complete, the digital contract envelope component (444) may be configured to forward the contract data elements to the deal processing component (410) for processing and transmit the updated digital contract envelope to the other entities party to the transaction. If the digital contract envelope is incomplete, the digital contract envelope component (444) may be configured to transmit the digital contract envelope, including the contract data elements and relevant signatures, to a next entity.

The computing device (114) may further include a data element redaction component (446) configured to obtain redaction of an identified subset of contract data elements. The data element redaction component (446) may be configured to provide contract data element escrow functionality and may manage the redaction, storage and redaction reversal of identified subsets of contract data elements. The contract data element redaction component (446) may use functionality provided by the trusted third party (122), for example by requesting redaction of a subset of contract data elements and, at the appropriate time, requesting a key to reverse redaction of the redacted contract data elements.

Figure 6:
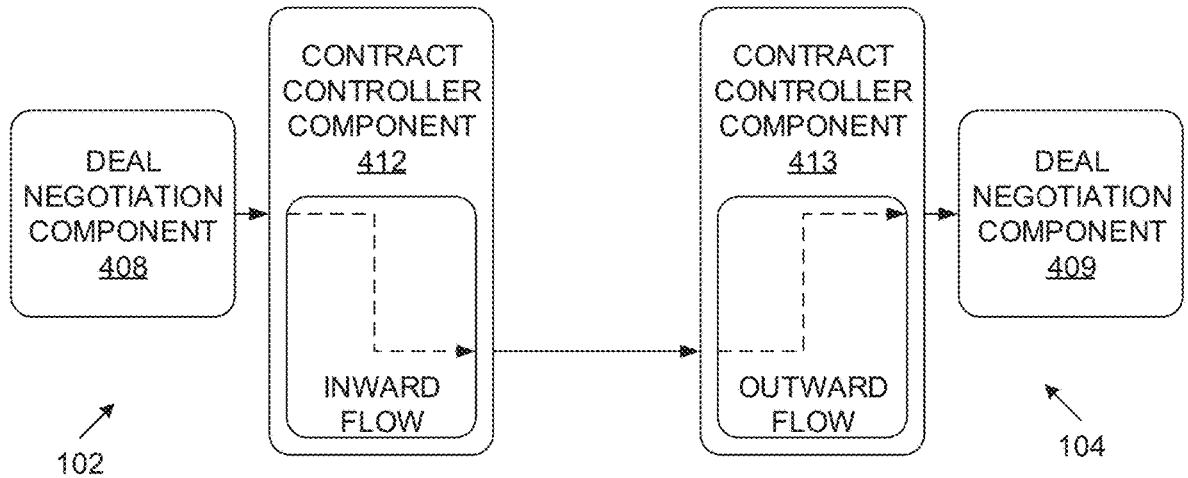
FIG. 6 is a schematic diagram which illustrates an inward and outward flow of contract data elements and/or digital contract envelopes between contract controller components of respective entities.

FIG. 6 is a schematic diagram which illustrates an inward and outward flow of contract data elements and/or digital contract envelopes between contract controller components of respective entities (102, 104). A set of contract data elements may be received from the deal negotiation component (408) into the contract controller component (412) of entity A (102) as a part of an inward flow. The contract controller component (412) of entity A (102) may then transmit the contract data elements (in some implementations by way of a digital contract envelope) to the contract controller component (413) of entity B (104). The contract controller component (413) of entity B (104) may receive the contract data elements and/or the digital contract envelope from entity A (102) and forward the contract data elements (if they are valid and if associated digital signatures are valid) to the relevant deal negotiation component (409) associated with entity B (104) as part of an outward flow. The deal negotiation component (409) may then process the contract data elements and return updated or further contract data elements to the contract controller component (413) for further processing as described herein.

The system and method described herein may be used to pass a contract between multiple deal negotiation components through respective contract controller components until the relevant template schema associated with the contract and/or contract identifier is satisfied and the relevant digital contract envelope is signed by all of the entities who are party to the contract. This may then constitute a deal.

The described system and method may simplify changing or adding terms to a contract without needing to change public APIs and enables each generation of the contract to be governed properly (e.g. through validation operations and digital signing). Digitally signing the contract data elements by each entity who is party to the contract may obviate any uncertainty regarding whether or not a binding contract is in place. This may prevent entities wishing to repudiate their involvement in a contract from simply altering their log files to support their repudiation.

Figure 7:
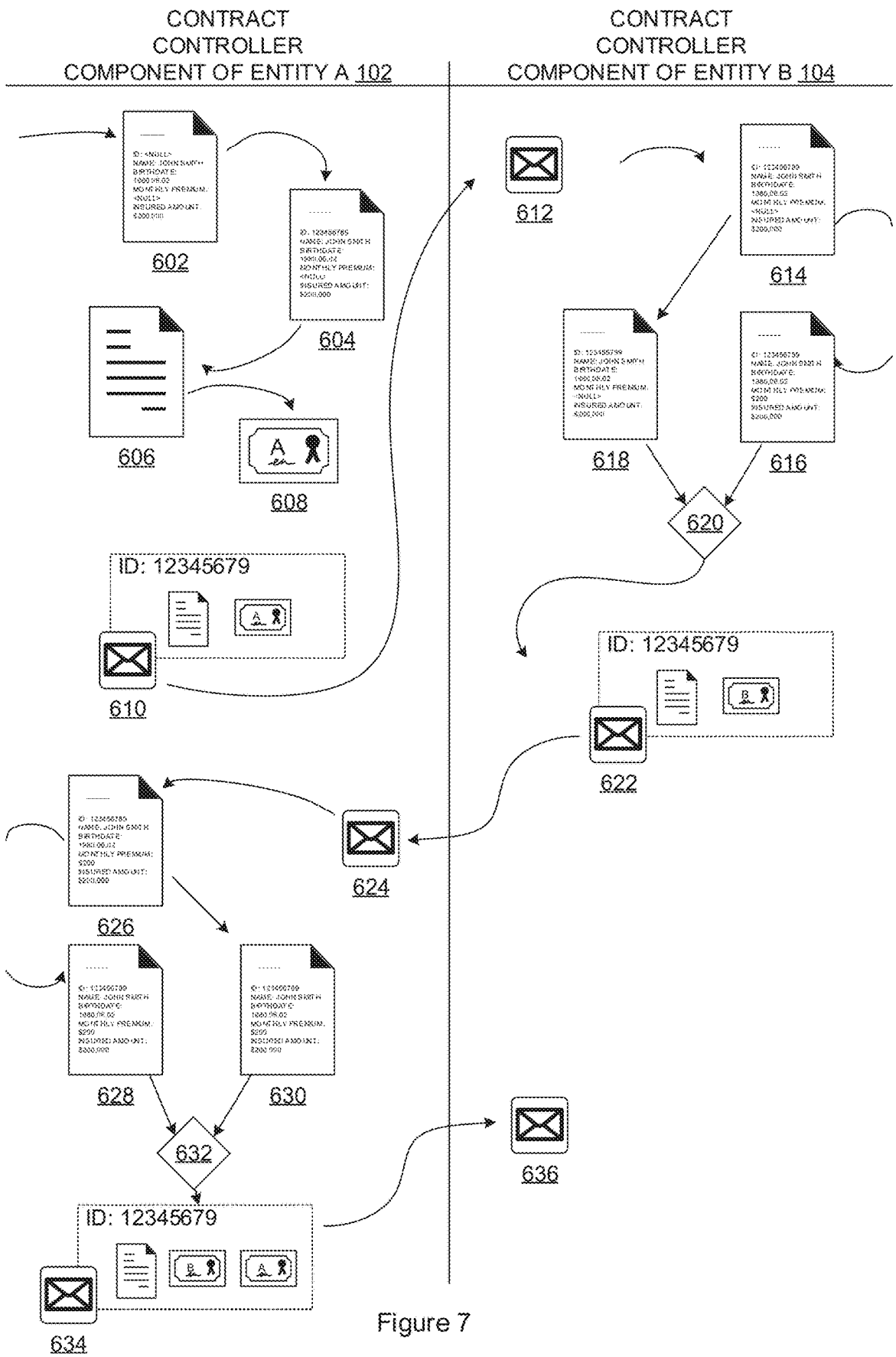
FIG. 7 is a schematic diagram which illustrates an exemplary protocol-based method for establishing a multi-party contract in use.

FIG. 7 is a schematic diagram which illustrates an exemplary protocol-based method for establishing a multi-party contract in use. The exemplary in-use scenario is described with reference to a specific example in order to facilitate a clear understanding and may use the above-described system and method.

Entity A (102) is a retail bank having entered into a framework agreement to on-sell life insurance provided by entity B (104), an insurance provider, to clients of entity A (102). Entity A (102) establishes a contract schema useable in establishing transaction agreements under the framework agreement. A transaction agreement may be concluded for each life insured by entity B (104).

Entity A (102) then commences a deal negotiation process. The deal negotiation process relates to the negotiation of a single deal (or transaction) under the framework agreement. In this life insurance example, it relates to the insuring of a single, specified life. The contract controller component of entity A (102) receives (602) a set of contract data elements. The contract data elements include the name of the insured life, birthdate of the insured life, and the insured amount.

The contract controller component of entity A (102) generates a globally unique contract identifier which uniquely identifies the contract (i.e. this particular transaction agreement relating to the insurance of the specified life) and inserts (604) the contract identifier into the contract identifier field of the contract schema. A schema identifier is also included in the contract data elements which identifies an appropriate contract schema. The contract controller component of entity A (102) also generates an obfuscation/de-obfuscation key which is uniquely associated with the contract identifier. The contract controller component of entity A (102) then validates the received contract data elements using the contract schema. If the contract data elements are valid, the contract controller component of entity A (102) obfuscates (606) the contract data elements using the obfuscation/de-obfuscation key and generates (608) a digital signature by digitally signing the obfuscated contract data elements. The contract controller component of entity A (102) includes (610) the obfuscated contract data elements, contract identifier and the entity A digital signature in a digital contract envelope and transmits the digital contract envelope to entity B (104).

The contract controller component of entity B (104) receives (612) the digital contract envelope and validates the digital signature included therein. If the digital signature is valid the contract controller component of entity B (104) stores the digital contract envelope and obtains the contract identifier therefrom. The contract controller component of entity B (104) obtains the obfuscation/de-obfuscation key. The contract controller component of entity B (104) de-obfuscates (614) the obfuscated contract data elements and uses the contract identifier and/or schema identifier to retrieve the appropriate contract schema and uses this to validate the contract data elements. If the contract data elements are valid, the contract controller component of entity B (104) identifies the appropriate deal negotiation component and transmits the contract data elements to the deal negotiation component.

In this exemplary scenario, the deal negotiation component determines an appropriate monthly premium and includes this in the contract data elements. This may be done automatically in accordance with the rules or conditions programmed into the deal negotiation component. The updated contract data elements are then returned (616) to the contract controller component of entity B (104). The contract controller component of entity B (104) queries the contract identifier field to obtain the contract identifier of the returned contract data elements and uses the obtained contract identifier to retrieve the appropriate contract schema. The contract controller component of entity B (104) uses the contract schema to validate the received contract data elements. If the contract data elements are valid the contract controller component of entity B (104) accesses and de-obfuscates (618) the previous contract data elements (e.g. that were stored together with the contract envelope), and compares (620) the received contract data elements with the accessed contract data elements.

If the contract data elements are unchanged, the accessed (and still obfuscated, i.e. not re-obfuscated) contract data elements are returned to entity A (102). In this scenario, this may indicate entity B declining to insure the life (and indicating this by not inserting a monthly premium). If the contract data elements have changed (in this case by virtue of the insertion of the monthly premium) then the received (updated) contract data elements are sent to entity A (102). This includes obfuscating the received contract data elements using the obfuscation/de-obfuscation key, generating a digital signature by digitally signing the obfuscated contract data elements and generating (622) a digital contract envelope which includes the obfuscated contract data elements and entity B's digital signature (entity A's digital signature is discarded as it no longer relates to the updated contract data elements). The contract envelope is then sent to entity A (102).

The contract controller component of entity A (102) receives (624) the digital contract envelope which includes the obfuscated contract data elements and entity B's digital signature. The contract controller component of entity A (102) validates the entity B digital signature and, if valid, stores the digital contract envelope. The contract controller component of entity A (102) de-obfuscates (626) the contract data elements using the obfuscation/de-obfuscation key. The contract controller component of entity A (102) then obtains the contract identifier from the contract data elements, retrieves the contract schema and validates the contract data elements.

If the contract data elements are valid, the contract controller component of entity A (102) transmits the contract data elements to the appropriate deal negotiation component for further processing (e.g. for approving or making a counter-offer on the monthly premium).

The contract controller component of entity A (102) subsequently receives (628) the contract data elements from the deal negotiation component and queries the contract identifier field to obtain the contract identifier. The contract controller component of entity A (102) then retrieves the contract schema and validates the contract data elements. If they are valid, the contract controller component of entity A (102) accesses (630) the previous contract data elements (which may include de-obfuscating them) and compares (632) the received contract data elements with the accessed contract data elements. If the contract data elements are unchanged (in this case indicating approval of the monthly premium proposed by entity B) then the accessed contract data elements are transmitted back to entity B (104). This includes generating a digital signature of the accessed contract data elements (which in this case are already obfuscated, having been so stored) and including (634) the generated digital signature in the accessed digital contract envelope (which already includes entity B's digital signature). The contract controller component of entity A (102) then checks the envelope for completeness and, if complete (i.e. digital signatures of all parties are present), transmits the envelope back to entity B (104). The contract controller component of entity B (104) receives (636) the digital contract envelope and both entities may store the digital contract envelope as a record of the transaction agreement being concluded.

Figure 8:
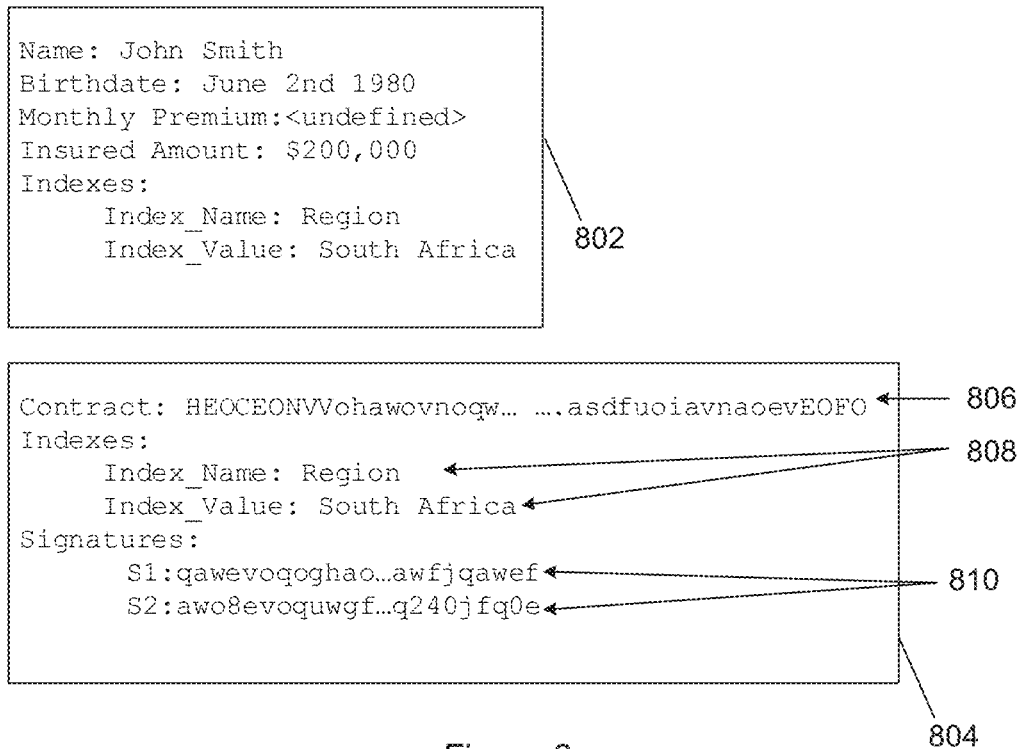
FIG. 8 is a schematic diagram which illustrates an exemplary contract and contract envelope; and, FIG. 9 illustrates an example of a computing device in which various aspects of the disclosure may be implemented.

FIG. 8 is a schematic diagram which illustrates an exemplary contract (802) and contract envelope (804). The contract (802) includes a number of contract data elements. In this exemplary scenario the contract data elements include "John Smith"; "Jun. 2, 1980"; "$200,000" and, as index name "Region" and index value "South Africa". The contract envelope (804) includes the obfuscated contract (806), the indexes (808) and signatures of parties having signed the document (810).

The entity signatures may be based on the obfuscated contract and the indexes. Once the above contract is complete, it may be transmitted to an independent third party (e.g. the trusted third party) for secure storage. Any appropriately authorised party may then, without becoming privy to the terms thereof, request from the third party all the contracts that have been concluded between, e.g. entity A and entity B, for, e.g., the South African region. The contracts associated with entities A and B may be identifiable by way of the digital signatures included in the contract envelopes. Accordingly, entities may be able to selectively publicize contract information outside the obfuscated elements, for example using appropriate index names and corresponding index values, for the explicit purpose of those elements to be used to make retrieval without de-obfuscation possible.

The term "obfuscation" of contract data elements as used herein may refer to the performance of an operation on the contract data elements to render them unreadable to parties not in possession of the corresponding obfuscation/de-obfuscation key. It is anticipated that all parties to the contract will have access to the obfuscation/de-obfuscation key. Obfuscation of the contract data elements may therefore be to prevent entities not party to the contract from accessing and using the contract data elements.

The term "redaction" of contract data elements as used herein may refer to the performance of an operation on the contract data elements to render them unreadable to parties not in possession of the appropriate key. It is anticipated only some (or only one) of the parties to the contract will have access to the appropriate key. Redaction of the contract data elements may therefore be to prevent other parties to the contract from accessing or using a subset of the contract data elements (at least for a predefined period, until a specified event occurs, etc.).

Figure 9:
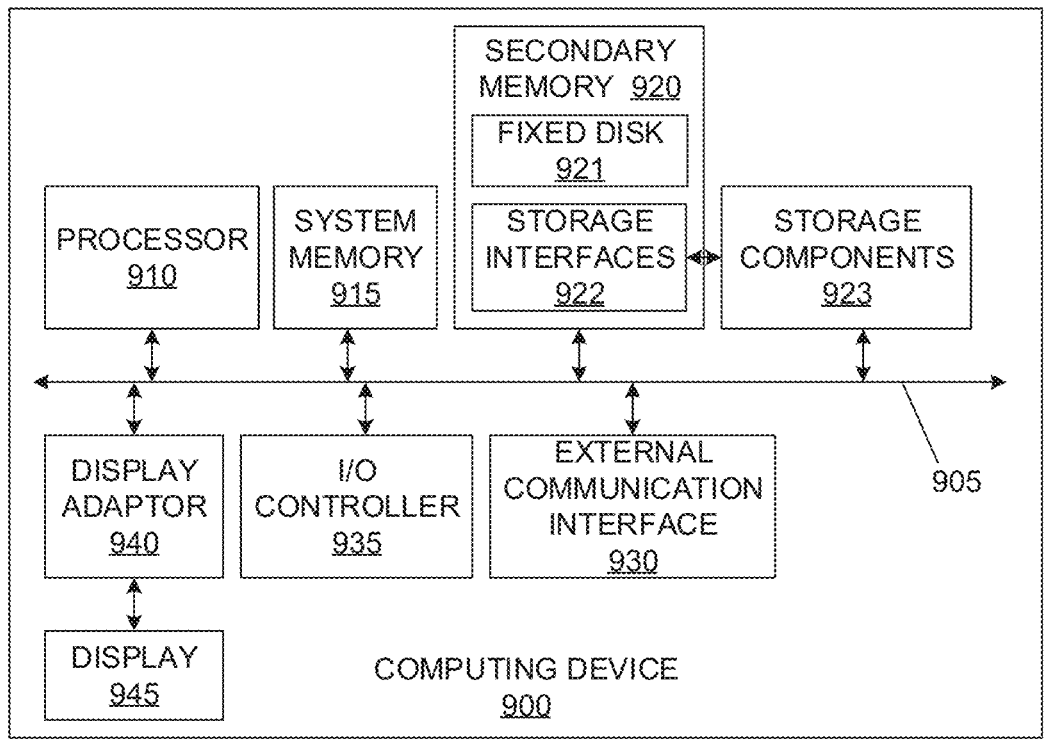

FIG. 9 illustrates an example of a computing device (900) in which various aspects of the disclosure may be implemented. The computing device (900) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (900) may be suitable for storing and executing computer program code. The various participants and elements in the previously described system diagrams may use any suitable number of subsystems or components of the computing device (900) to facilitate the functions described herein. The computing device (900) may include subsystems or components interconnected via a communication infrastructure (905) (for example, a communications bus, a network, etc.). The computing device (900) may include one or more processors (910) and at least one memory component in the form of computer-readable media. The one or more processors (910) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (900) may be distributed over a number of physical locations (e.g. in a distributed, cluster or cloud-based computing configuration) and appropriate software units may be arranged to manage and/or process data on behalf of remote devices.

The memory components may include system memory (915), which may include read only memory (ROM) and random access memory (RAM). A basic input/output system (BIOS) may be stored in ROM. System software may be stored in the system memory (915) including operating system software. The memory components may also include secondary memory (920). The secondary memory (920) may include a fixed disk (921), such as a hard disk drive, and, optionally, one or more storage interfaces (922) for interfacing with storage components (923), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (900) may include an external communications interface (930) for operation of the computing device (900) in a networked environment enabling transfer of data between multiple computing devices (900) and/or the Internet. Data transferred via the external communications interface (930) may be in the form of signals, which may be electronic, electromagnetic, optical, radio, or other types of signal. The external communications interface (930) may enable communication of data between the computing device (900) and other computing devices including servers and external storage facilities. Web services may be accessible by and/or from the computing device (900) via the communications interface (930).

The external communications interface (930) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (910). A computer program product may be provided by a non-transient computer-readable medium, or may be provided via a signal or other transient means via the communications interface (930).

Interconnection via the communication infrastructure (905) allows the one or more processors (910) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (900) either directly or via an I/O controller (935). One or more displays (945) (which may be touch-sensitive displays) may be coupled to or integrally formed with the computing device (900) via a display (945) or video adapter (940).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims, unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method comprising:
   receiving, by a receiving component of a computing device associated with an entity, a set of contract data elements relating to a contract to be established including at least some negotiable contract data elements, the set of contract data elements being received from a deal negotiation component associated with the computing device, wherein the deal negotiation component is configured for automatic negotiation of contracts without human intervention;
   validating, by a validating component of the computing device, the contract data elements using an associated contract schema and a schema-based validation algorithm, wherein the contract schema is a schema definition and contains sufficient information for electronically validating the contract data elements;
   determining, by the validating component of the computing device, that the contract data elements are valid and complete;
   in response to determining that the contract data elements are valid and complete,
   generating, by a digital signature component of the computing device, a digital signature associated with the contract data elements by digitally signing the contract data elements or a representation thereof using an encryption key associated with the entity; and,
   transmitting, by a transmitting component of the computing device, through a network, to a contract controller component of a second computing device associated with another entity, the digital signature and either of the contract data elements or the representation thereof for acceptance or replacement of the contract data elements by a deal negotiation component of the second computing device.

2. The method as claimed in claim 1, wherein receiving the contract data elements includes querying a contract identifier field associated with the contract data elements, the contract identifier field being configured for storing a globally unique contract identifier.

3. The method as claimed in claim 2, including, when the contract identifier field contains a null value:
   obtaining a contract identifier;
   associating the contract data elements with the contract identifier including updating the contract identifier field to include the obtained contract identifier; and,
   storing the contract data elements.

4. The method as claimed in claim 2, including, when the contract identifier field contains a contract identifier:
   accessing a set of contract data elements associated with the contract identifier and having been stored previously, the previously stored set of contract data elements having been stored in association with an originating entity digital signature, the originating entity digital signature having been generated by an originating entity digitally signing the previously stored set of contract data elements or a representation thereof using an encryption key associated with the originating entity; and,
   comparing the received contract data elements with the accessed contract data elements.

5. The method as claimed in claim 4, wherein, when the received contract data elements are not the same as the accessed contract data elements, transmitting the digital signature and either of the contract data elements or the representation thereof to the contract controller component of the second computing device includes:
   generating a digital signature associated with the received contract data elements by digitally signing the received contract data elements or a representation thereof using the encryption key associated with the entity; and,
   transmitting the digital signature and either of the received contract data elements or the representation thereof to the contract controller component of the second computing device,
   and wherein, when the received contract data elements are the same as the accessed contract data elements, transmitting the digital signature and either of the contract data elements or the representation thereof to the contract controller component of the second computing device includes:
   generating a digital signature associated with the accessed contract data elements by digitally signing the accessed contract data elements or a representation thereof using the encryption key associated with the entity; and
   transmitting the digital signature, the originating entity digital signature and either of the accessed contract data elements or the representation thereof to the contract controller component of the second computing device.

6. The method as claimed in claim 1, wherein validating the contract data elements using a schema-based validation algorithm uses a predetermined contract schema associated with a contract identifier.

7. The method as claimed in claim 6, including retrieving the contract schema associated with the contract data elements.

8. The method as claimed in claim 1, wherein the representation of the contract data elements is an obfuscation of the contract data elements, and wherein the method includes obfuscating and de-obfuscating the contract data elements using an obfuscation/de-obfuscation key.

9. The method as claimed in claim 8, wherein the contract data elements are obfuscated prior to transmission to the contract controller component of the second computing device.

10. The method as claimed in claim 1, wherein the contract data elements are transmitted to the contract controller component of the second computing device, and stored by the computing device associated with the entity, by way of a digital contract envelope, and wherein the digital contract envelope is configured to include one or more of the group of: the contract data elements or the representation thereof; digital signatures of the entities establishing the contract; and a stamp configured for implementing protocol maintenance functions.

11. The method as claimed in claim 10, including, when received contract data elements are the same as accessed contract data elements:
updating a previously stored digital contract envelope including an originating entity digital signature and being associated with the contract data elements to include the digital signature generated by the digital signature component of the computing device;
determining whether the updated digital contract envelope is complete or incomplete; and,
when the updated digital contract envelope is complete, forwarding the contract data elements to a deal processing component associated with the computing device and transmitting the updated digital contract envelope to the contract controller component of the second computing.

12. The method as claimed in claim 11, wherein determining whether the updated digital contract envelope is complete or incomplete includes:
checking that validation of the contract data elements was successful;
using the contract schema to determine whether digital signatures of each entity party to the contract are included in the updated digital contract envelope; and
checking that all the contract data elements are furnished according to requirements of the contract schema.

13. The method as claimed in claim 1, wherein the method repeats up to a time when the contract data elements, or a representation thereof, have valid digital signatures of all entities party to the contract.

14. The method as claimed in claim 1, wherein a subset of the contract data elements are redacted such that the subset of the contract data elements is kept confidential or otherwise withheld from one or more entities who are party to the contract.

15. A system comprising:
a computing device associated with an entity and having a processor and a memory configured to provide computer program instructions to the processor to execute functions of components;
a receiving component of the computing device for receiving a set of contract data elements relating to a contract to be established including at least some negotiable contract data elements, the set of contract data elements being received from a deal negotiation component associated with the computing device, wherein the deal negotiation component is configured for automatic negotiation of contracts without human intervention;
a validating component of the computing device for validating the contract data elements using an associated contract schema and a schema-based validation algorithm, wherein the contract schema is a schema definition and contains sufficient information for electronically validating the contract data elements, and for determining that the contract data elements are valid and complete;
a digital signature component of the computing device for, in response to the validating component determining that the contract data elements are valid and complete,
generating a digital signature associated with the contract data elements by digitally signing the contract data elements or a representation thereof using an encryption key associated with the entity; and,
a transmitting component of the computing device for transmitting, through a network, to a contract controller component of a second computing device associated with another entity, the digital signature and either of the contract data elements or the representation thereof for acceptance or replacement of the contract data elements by a deal negotiation component of the second computing device.

16. A computer program product comprising a non-transitory computer-readable medium having stored computer-readable program code for performing the steps of:
receiving, by a receiving component of a computing device associated with an entity, a set of contract data elements relating to a contract to be established including at least some negotiable contract data elements, the set of contract data elements being received from a deal negotiation component associated with the computing device, wherein the deal negotiation component is configured for automatic negotiation of contracts without human intervention;
validating, by a validating component of the computing device, the contract data elements using an associated contract schema and a schema-based validation algorithm, wherein the contract schema is a schema definition and contains sufficient information for electronically validating the contract data elements;
determining, by the validating component of the computing device, that the contract data elements are valid and complete;
in response to determining that the contract data elements are valid and complete,
generating, by a digital signature component of the computing device, a digital signature associated with the contract data elements by digitally signing the contract data elements or a representation thereof using an encryption key associated with the entity; and,
transmitting, by a transmitting component of the computing device, through a network, to a contract controller component of a second computing device associated with another entity, the digital signature and either of the contract data elements or the representation thereof for acceptance or replacement of the contract data elements by a deal negotiation component of the second computing device.

17. The method as claimed in claim 1, wherein the contract schema includes a formal definition of attributes and structure of valid data.

18. The method as claimed in claim 1, wherein the contract schema is configured to express a set of computer-readable rules to which a contract must conform.

19. The method as claimed in claim 1, wherein the contract schema provides a vocabulary for computer-implemented annotation and validation of contracts.

20. The system as claimed in claim 15, comprising the second computing device associated with the other entity, wherein the deal negotiation component of the second computing device is configured for automatic negotiation of contracts without human intervention.

* * * * *